United States Patent
Hathaway et al.

(10) Patent No.: US 8,612,366 B2
(45) Date of Patent: Dec. 17, 2013

(54) SYSTEMS AND METHODS FOR PERFORMING DESIGN OF EXPERIMENTS

(75) Inventors: William M. Hathaway, Powell, OH (US); Smita Kulkarni Skrivanek, Indianapolis, IN (US)

(73) Assignee: MoreSteam.com LLC, Powell, OH (US)

(*) Notice: Subject to any disclaimer, the term of this patent is extended or adjusted under 35 U.S.C. 154(b) by 390 days.

(21) Appl. No.: 12/893,881

(22) Filed: Sep. 29, 2010

(65) Prior Publication Data

US 2012/0079379 A1    Mar. 29, 2012

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,953,005 | A | 9/1999 | Liu |
| 6,236,955 | B1 | 5/2001 | Summers |
| 6,325,632 | B1 | 12/2001 | Chao et al. |
| 6,735,596 | B2 | 5/2004 | Corynen |
| 7,062,458 | B2 | 6/2006 | Maggioncalda et al. |
| 7,308,653 | B2 | 12/2007 | Lin-Hendel |
| 7,787,058 | B1 | 8/2010 | Smereski et al. |
| 2002/0076674 | A1 | 6/2002 | Kaplan |
| 2002/0182570 | A1 | 12/2002 | Croteau et al. |
| 2003/0145338 | A1 | 7/2003 | Harrington |
| 2003/0167265 | A1 | 9/2003 | Corynen |
| 2004/0013292 | A1 | 1/2004 | Raunig |
| 2004/0115608 | A1 | 6/2004 | Meyer et al. |
| 2004/0158338 | A1 | 8/2004 | Mammoser et al. |
| 2005/0004789 | A1 | 1/2005 | Summers |
| 2005/0075915 | A1 | 4/2005 | Clarkson |
| 2007/0038559 | A1 | 2/2007 | Jung et al. |
| 2007/0061274 | A1 | 3/2007 | Gipps et al. |
| 2008/0109750 | A1 | 5/2008 | Lin-Hendel |
| 2009/0138415 | A1* | 5/2009 | Lancaster ...................... 706/11 |

OTHER PUBLICATIONS

Design-Expert "Section 11—Statistical Details: Design Selection": http://www.statease.info/dx6files/manual/DX11-Details-Design.pdf, 2001, pp. 30.*
General Factorial Tutorial (in Design-Expert 8 Manual: http://www.statease.com/dx8_man.html), Jun. 2010, pp. 13.*

(Continued)

*Primary Examiner* — Li-Wu Chang
(74) *Attorney, Agent, or Firm* — Michael Best & Friedrich LLP

(57) ABSTRACT

A method of automatically designing a plurality of experiments for analyzing at least one data set from a process to determine a relationship of a plurality of process factors of interest to a process output of interest. The method uses a computer to elicit input from a user to determine at least one characteristic of the data set including a quantity of the plurality of factors and whether one or more of the plurality of factors has greater than two levels, selects a design from a plurality of experiment designs based on established conventions for each of the plurality of experiment designs, the design applicable to the elicited at least one characteristic of the data set, and provides a design of experiments including a standard order of the experiments and a run order of the experiments, the design of experiments indicating the combinations of factors and levels for each experiment.

20 Claims, 36 Drawing Sheets

(56) References Cited

OTHER PUBLICATIONS

Anderson "How to Prevent Failures via an Augmented Screening Experiment": http://www.statease.com/pubs/ruggednesstest.pdf, 2008, pp. 11.*

Rutgers, "Academic Integrity Policy" <Retreived from http://web.archive.org/web/20071 027042644/http://academicinteg rity.rutgers.edu/integrity.shtml> Available as early as Oct. 27, 2007 (7 pages).

Minitab, "Meet Minitab," dated 2010 (122 pages).

Jay Arthur, "QI Macros for all Versions of Excel 2000-2010," dated 2011 (19 pages).

Sigma XL, "Overview of Basic Design of Experiments (DOE) Templates," available as early as Jul. 29, 2011 (6 pages).

SAS Institute Inc., "JMP User Guide," dated May 2007 (506 pages).

Stat-Ease, "Getting Started with Version 8 of Design-Ease Software," Taguchi Design Tutorial, dated Sep. 13, 2010 (175 pages).

* cited by examiner

Step 5: Use the power of the design to decide on the number of replicates to run (only for two-level designs)

The power of a design quantifies the ability of the design to detect an effect of certain size. The table on the screen shows the power of the chosen design with a single replicate to detect an effect of 2 standard deviations. The last two columns give the number of replicates that would be required to gain at least 80% power and at least 90% power.

Notes:

1. The default alpha used in the power calculation = 0.05
2. When a design has two or more replicates, these replicates are used to calculate the error variance used to evaluate significance of the factor effects. The power for such designs is based on a model containing all the possible factor effects For designs with only a single replicate, the highest order effects (three-level and higher order) are used to estimate the error variance. The design power in this case is based on a model containing all the remaining (lower order) effects. For e.g. in a single replicate of a 2-factor (A, B) design, interaction AB is used to estimate error, so the power calculation of 12.6% is based on a model containing only main effects A and B.
3. An effect size is defined as the minimum change to be detected (Delta), also called the signal, divided by the standard deviation (sd), also called 'noise'; thus, the Effect = Delta/sd. Effect is also called the Signal-to-Noise ratio.
4. All power calculations are based on detecting an effect size of 2 standard deviations.
5. Blocks are not included in the model, so power does not change if you increase the number of blocks.
6. In general you should aim for at least 80% power to detect important effects within your design.

Some tips for improving the power of your design:

1) Increase the significance level, also called alpha risk (Type I Error rate). This means you will have a higher chance of detecting false positive effects.
2) Replicate the design. This will increase the number of runs in your design - a higher cost.
3) If using a fractional factorial design, go to a higher fraction. This will result in a higher resolution design but will also add more runs.
4) Set your factor levels (High - Low) farther apart. This will likely increase the effect size, making it easier to detect the effect with the same amount of data.
5) Use blocks to account for known sources of variation. This will reduce the error variance and again make it easier to detect the important effects.
6) Make multiple measurements on the response variable and use the average as your response - this will reduce the variance in the response, achieving the same result as above.

SYSTEMS AND METHODS FOR PERFORMING DESIGN OF EXPERIMENTS

FIELD OF THE INVENTION

The invention relates to systems and methods for assisting a user in designing experiments. Specifically, the invention provides a wizard for guiding a user through the design of experiments.

BACKGROUND OF THE INVENTION

Design of Experiments (DOE) is used to analyze a process to determine which process inputs have the greatest impact on the process. The process inputs, referred to as factors (e.g., temperature, quantity, etc.), have different levels. DOE allows a comparison of how different levels for the factors impact the process output or response. DOE uses randomization and replication to improve the results of the experiment. A concept called blocking allows variable factors to be removed from the experiment (e.g., differences between workers on a first shift and a second shift). Experiments are then created using full or fractional factorial designs.

SUMMARY OF THE INVENTION

In one embodiment, the invention provides a method of automatically designing a plurality of experiments for analyzing at least one data set from a process to determine a relationship of a plurality of process factors of interest to a process output of interest. The method uses a computer to elicit input from a user to determine at least one characteristic of the data set including a quantity of the plurality of factors and whether one or more of the plurality of factors has greater than two levels, selects a design from a plurality of experiment designs based on established conventions for each of the plurality of experiment designs, the design applicable to the elicited at least one characteristic of the data set, and provides a design of experiments including a standard order of the experiments and a run order of the experiments, the design of experiments indicating the combinations of factors and levels for each experiment.

In another embodiment, the invention provides a non-transitory computer readable medium accessible by a computer processor. The computer readable medium includes a software program for automatically designing a plurality of experiments for analyzing at least one data set from a process to determine a relationship of a plurality of process factors of interest to a process output of interest. The software includes modules which elicit input from a user to determine at least one characteristic of the data set including a quantity of the plurality of factors and whether one or more of the plurality of factors has greater than two levels, which select a design from a plurality of experiment designs based on established conventions for each of the plurality of experiment designs, the design applicable to the elicited at least one characteristic of the data set, and which provide a design of experiments including a standard order of the experiments and a run order of the experiments, the design of experiments indicating the combinations of factors and levels for each experiment.

Other aspects of the invention will become apparent by consideration of the detailed description and accompanying drawings.

BRIEF DESCRIPTION OF THE DRAWINGS

FIG. 2 is a spreadsheet for defining a design of experiments project.

FIG. 4 is a user interface screen displayed by the wizard.

FIG. 11 is a process specific help screen displayed by the wizard.

FIG. 15 is a user interface screen displayed by the wizard.
FIG. 17 is a user interface screen displayed by the wizard.
FIG. 20 is a user interface screen displayed by the wizard.
FIG. 21 is a user interface screen displayed by the wizard.
FIG. 22 is a user interface screen displayed by the wizard.
FIG. 23 is a user interface screen displayed by the wizard.
FIG. 24 is a user interface screen displayed by the wizard.
FIG. 25 is a user interface screen displayed by the wizard.
FIG. 26 is a user interface screen displayed by the wizard.
FIG. 28 is a design of experiments response entry screen generated by the wizard.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
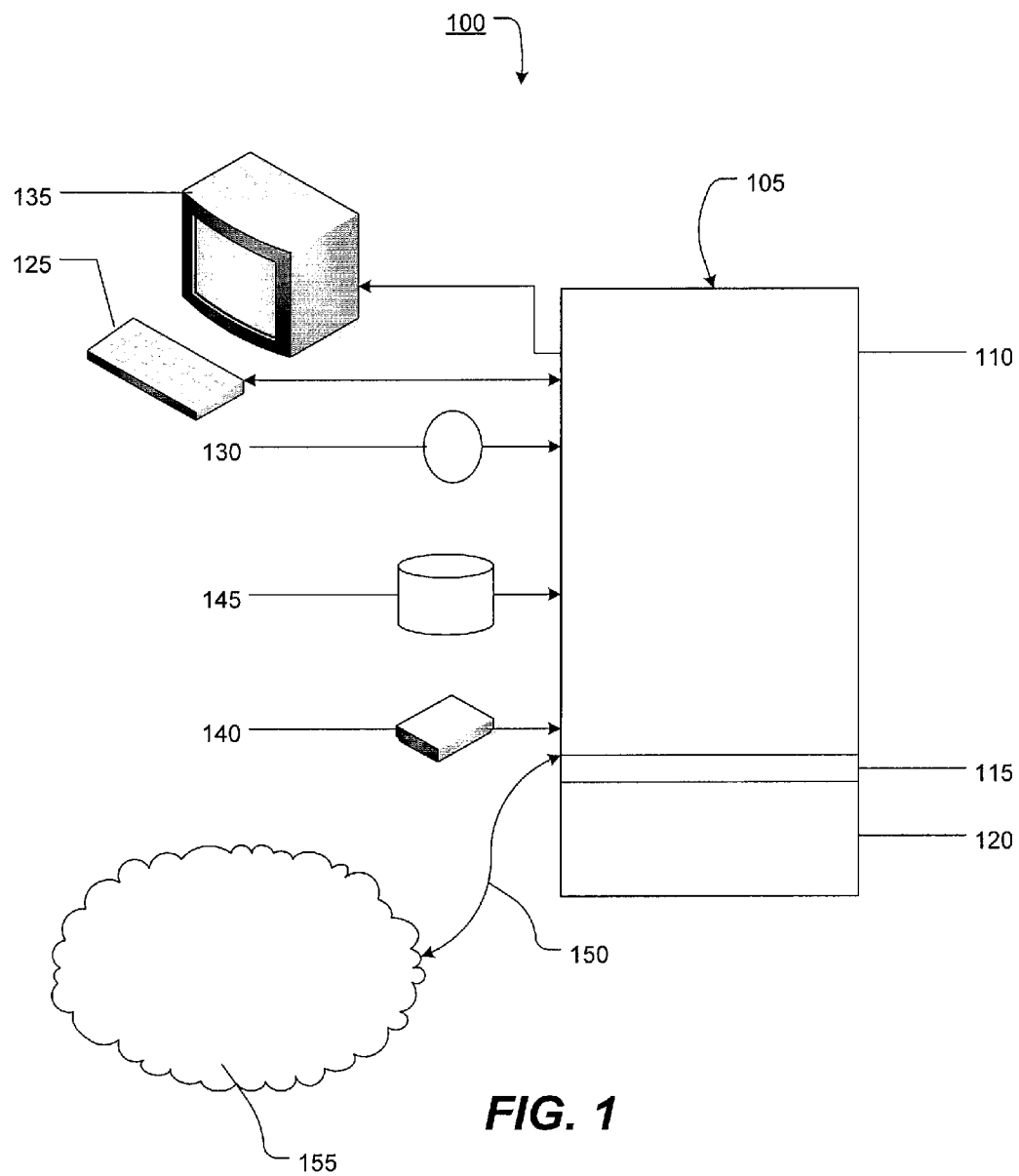
FIG. 1 is a schematic diagram of a computer system for implementing a software program embodying the invention.

FIG. 1 illustrates a system for performing DOE according to an embodiment of the present invention. The system includes a general purpose computer 100. The computer 100 provides a platform for operating a software program that guides a user through the design of experiments and then analyzes the results of the experiment. In the system identified, data and program files are input to the computer 100, which reads the files and executes the programs therein. Some of the elements of the computer 100 include a processor 105 having an input/output (IO) section 110, a central processing unit (CPU) 115, and a memory module 120. In one form, the software program for DOE is loaded into a non-transitory computer readable medium such as a memory 120 and/or a configured CD ROM (not shown) or other storage device (not shown). The software program includes instructions that are executed by the processor 105. The IO section 110 is connected to a keyboard 125 and an optional user input device or mouse 130. The keyboard 125 and mouse 130 enable the user to control the computer 100. IO section 110 is also connected to a monitor 135. In operation, computer 100 generates the user interfaces identified in FIGS. 4-34 and displays those user interfaces on the monitor 135. The computer also includes a CD ROM drive 140 and a data storage unit 145 connected to IO section 110. In some embodiments, the software program for DOE may reside on the storage unit 145 or in memory unit 120 rather than being accessed through the CD ROM drive using a CD ROM. Alternatively, CD ROM drive 140 may be replaced or supplemented by a floppy drive unit, a tape drive unit, a flash drive, or other data storage device. The computer 100 also includes a network interface 150 connected to IO section 110. The network interface 150 can be used to connect the computer 100 to a local area network (LAN), wide are network (WAN), internet based portal, or other network 155. Any suitable interface can suffice, including both wired and wireless interfaces. Thus, the software may be accessed and run locally as from CD ROM drive 140, data storage device 145, or memory 120, or may be remotely accessed through network interface 150. In the networked embodiment, the software may be stored remote from the computer 100 on a server or other appropriate hardware platform or storage device.

Figure 2:
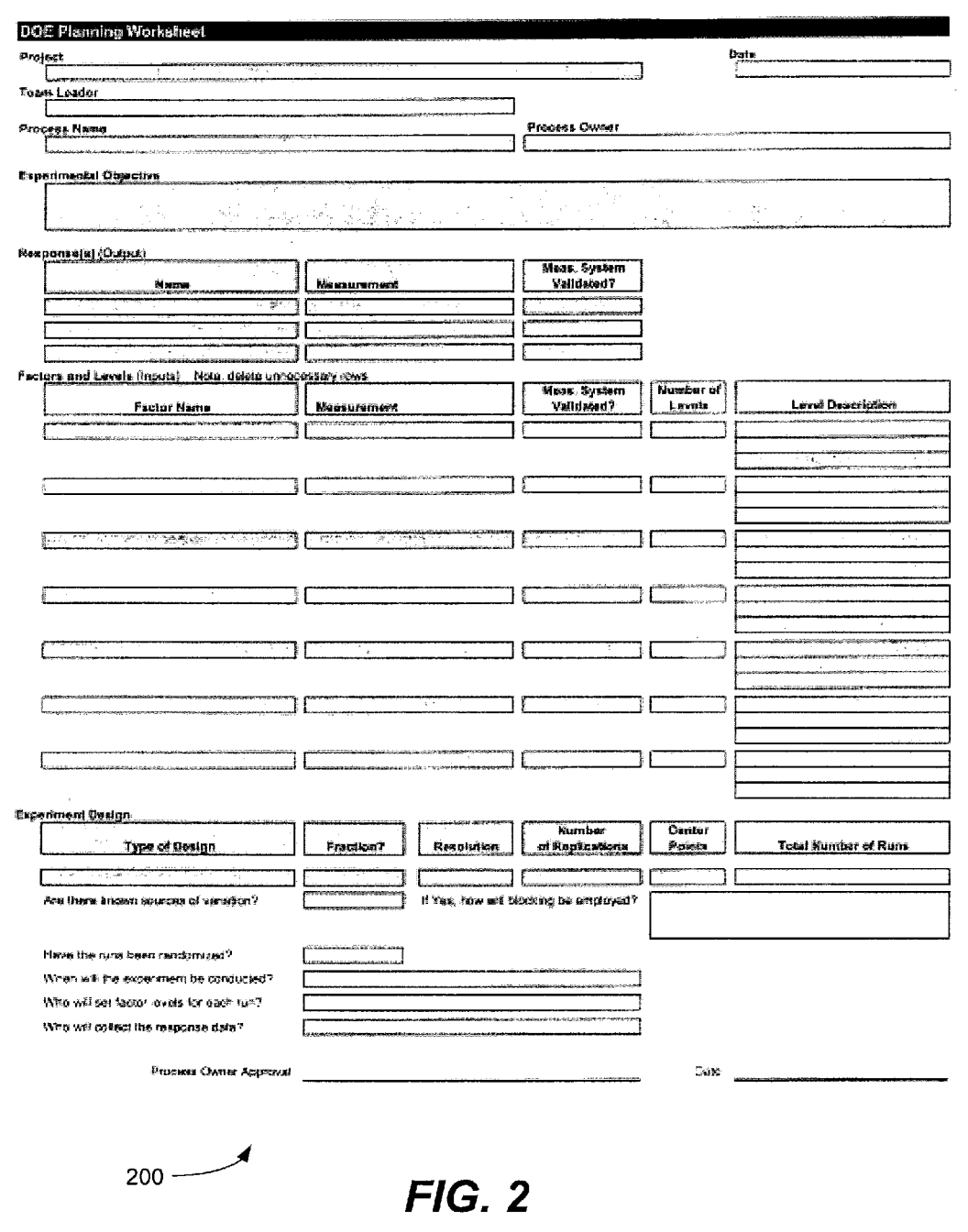

In one embodiment, the software is an add-in running in Microsoft® Excel®. A user loads the software onto the computer 100, and when the user starts up Excel® a menu selection for the add-in appears on a menu bar. By clicking through the menu selection and any submenus, the user is provided with a DOE menu. In some embodiments, the DOE menu provides the user with four choices: a DOE planning worksheet, a design wizard, a run default analysis, and a run custom analysis. Clicking the DOE planning worksheet opens a new worksheet 200 (FIG. 2). The worksheet 200 includes a plurality of cells for defining experiments. The worksheet 200, while optional, assists a user in planning experiments by having the user provide all the information that will be needed to design the experiments. In addition, spaces are provided for information that is useful for implementing the experiments (e.g., the process owner's name, the objective of the experiments, etc.).

Figure 3A:
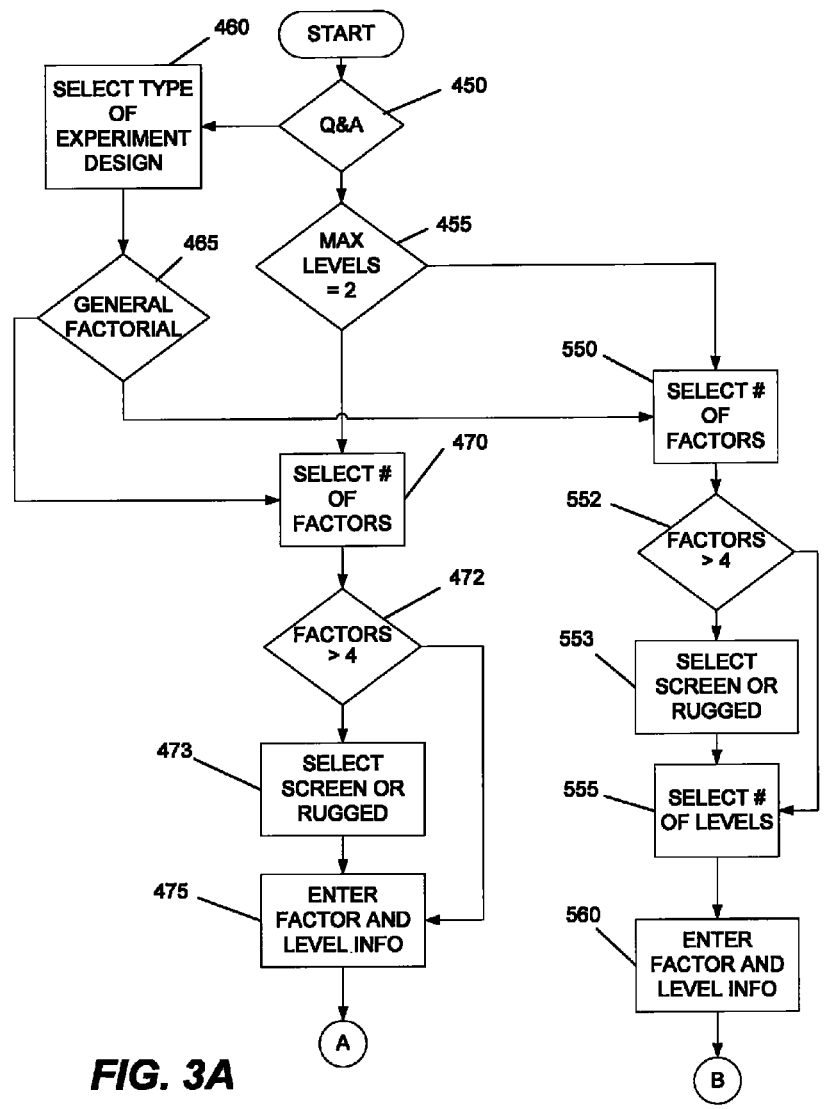
FIGS. 3A and 3B are an embodiment of the operation of a wizard for designing experiments.
Figure 3B:
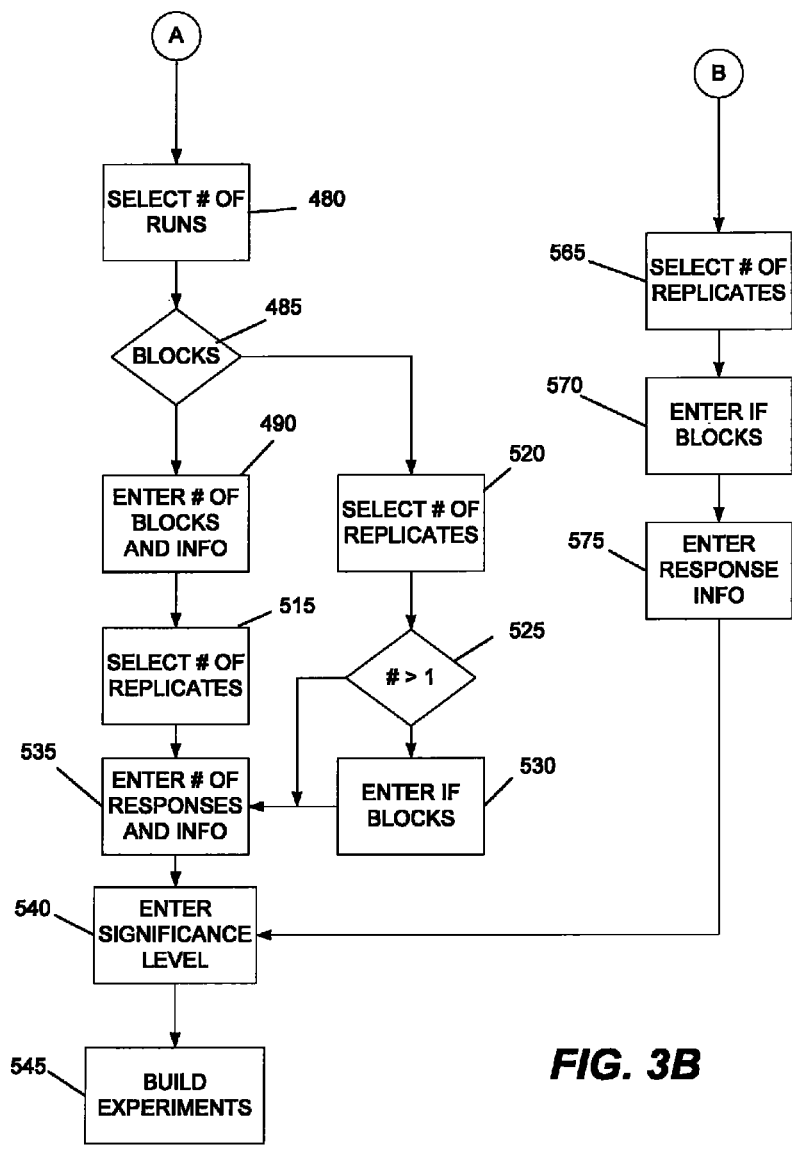
Figure 4:
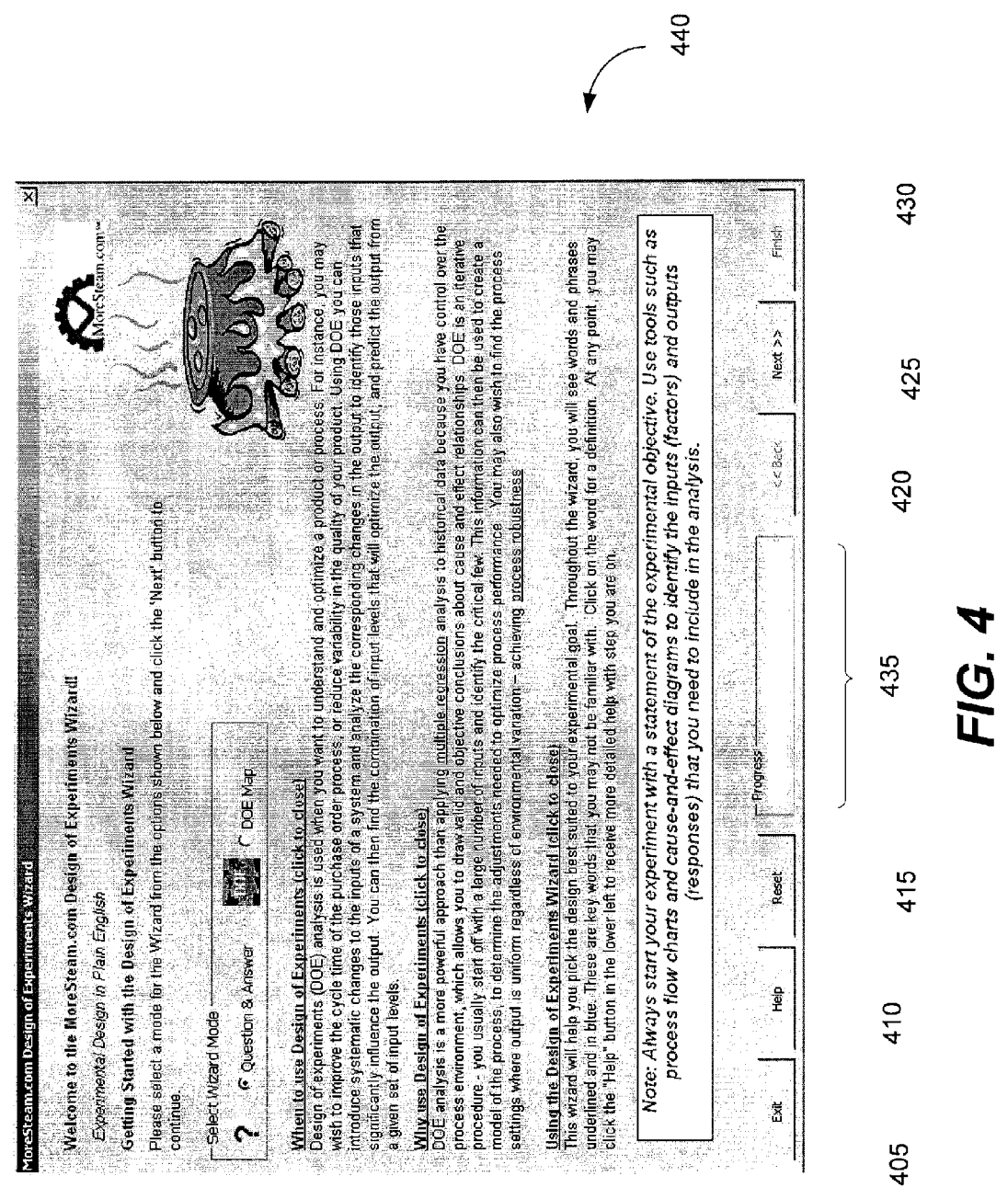
Figure 5:
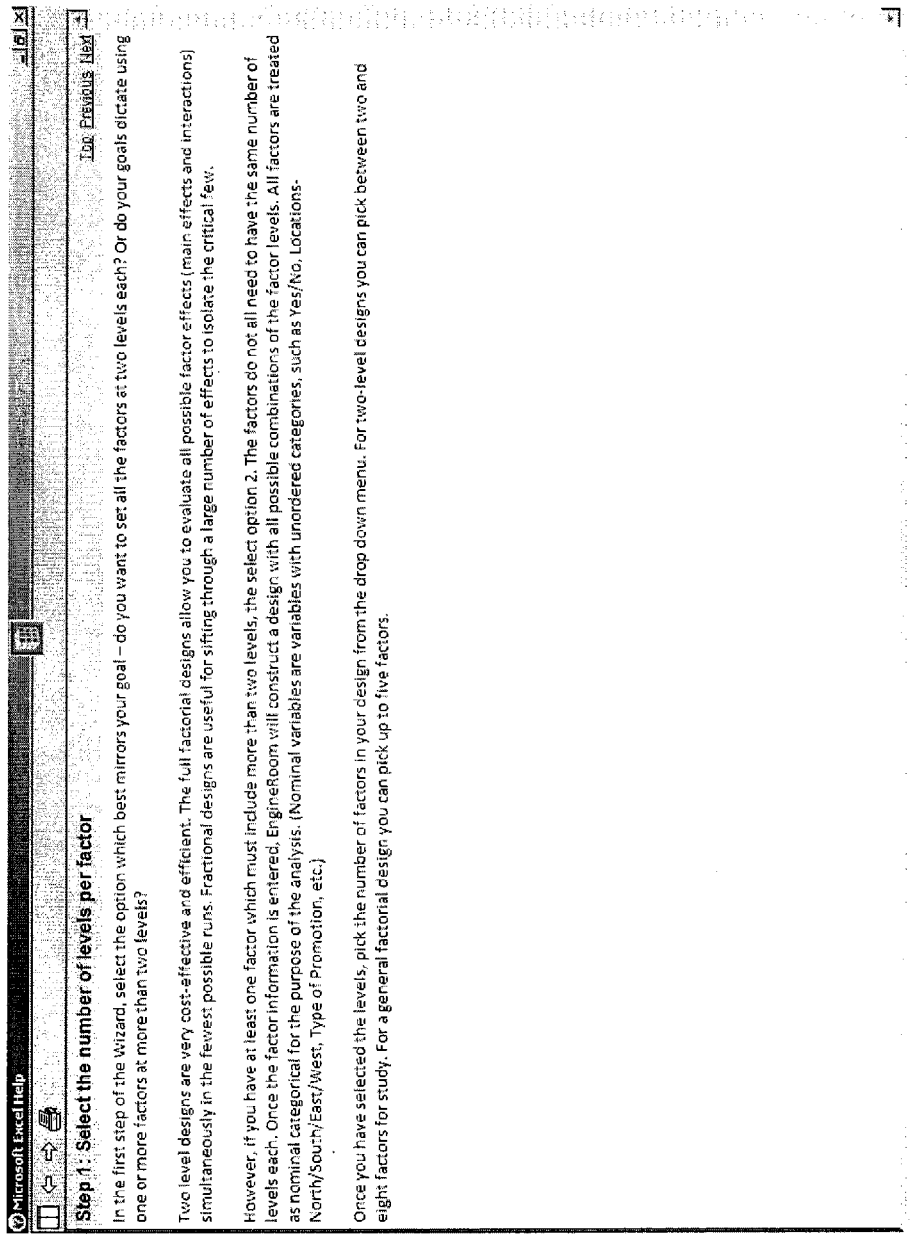
FIG. 5 is a process specific help screen displayed by the wizard.
Figure 6:
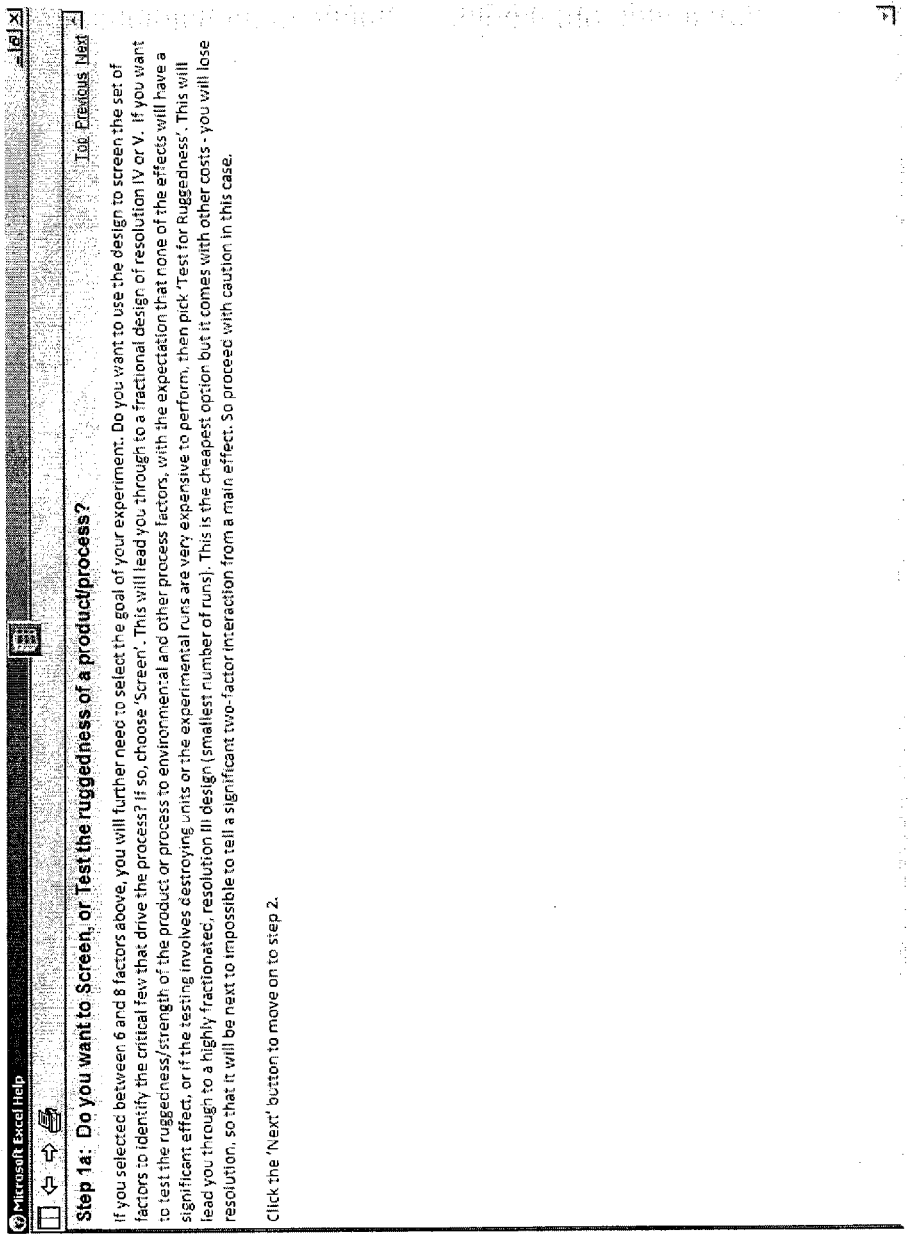
FIG. 6 is a process specific help screen displayed by the wizard.
Figure 7:
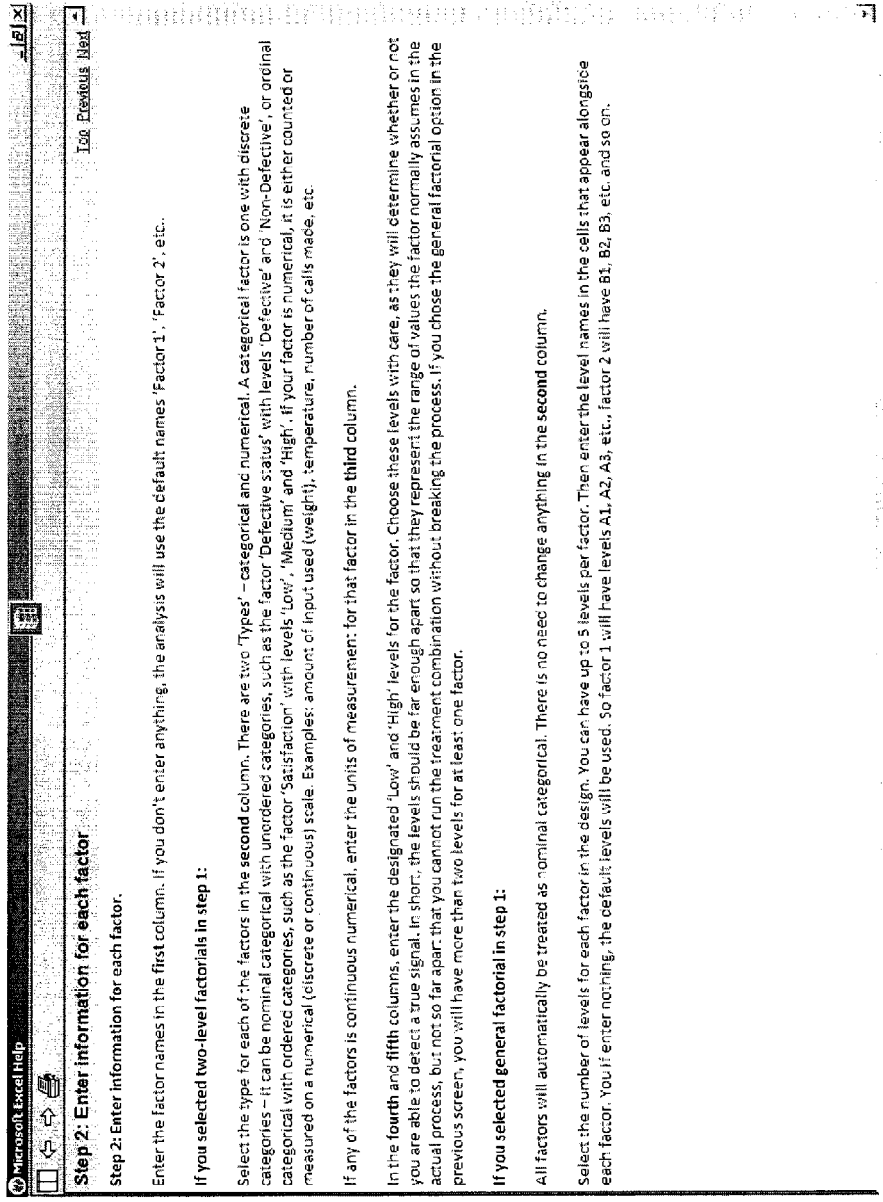
FIG. 7 is a process specific help screen displayed by the wizard.
Figure 8:
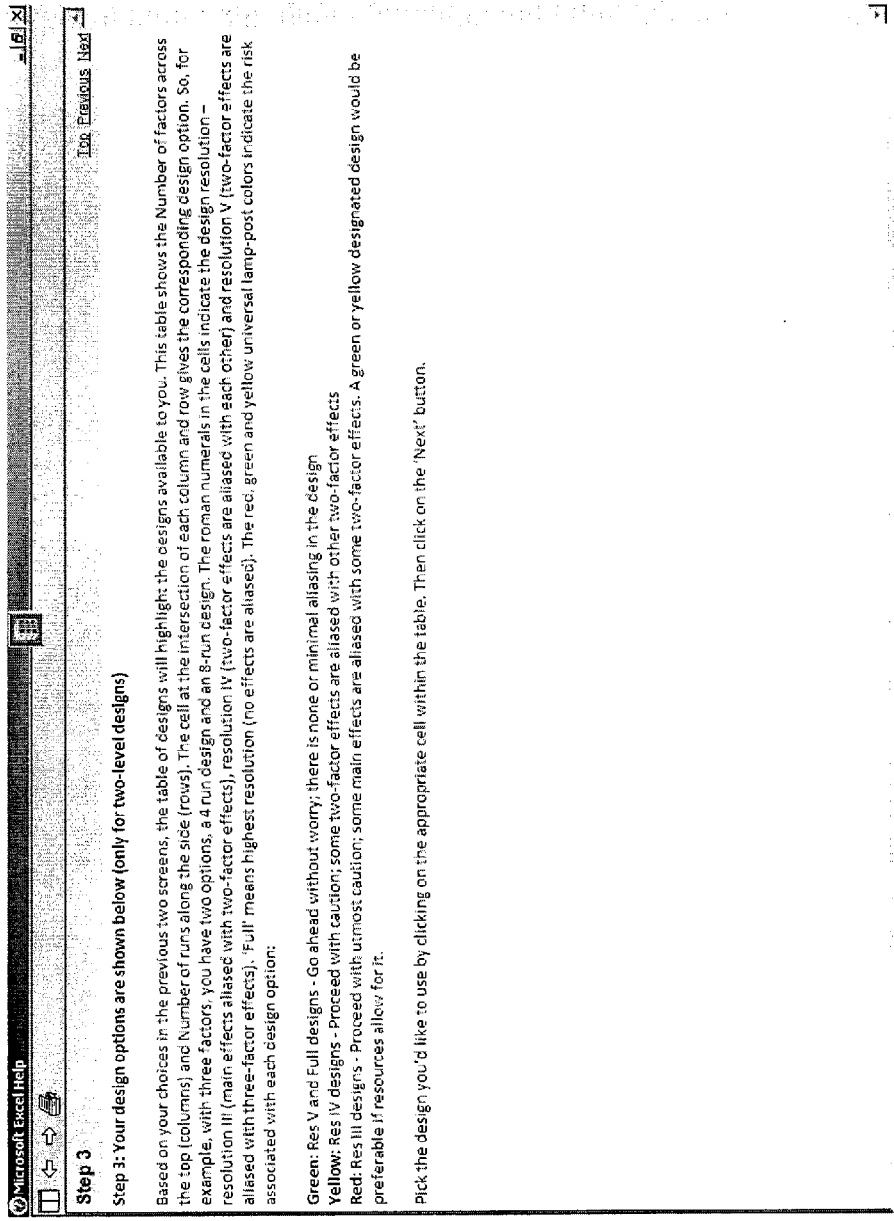
FIG. 8 is a process specific help screen displayed by the wizard.
Figure 9:
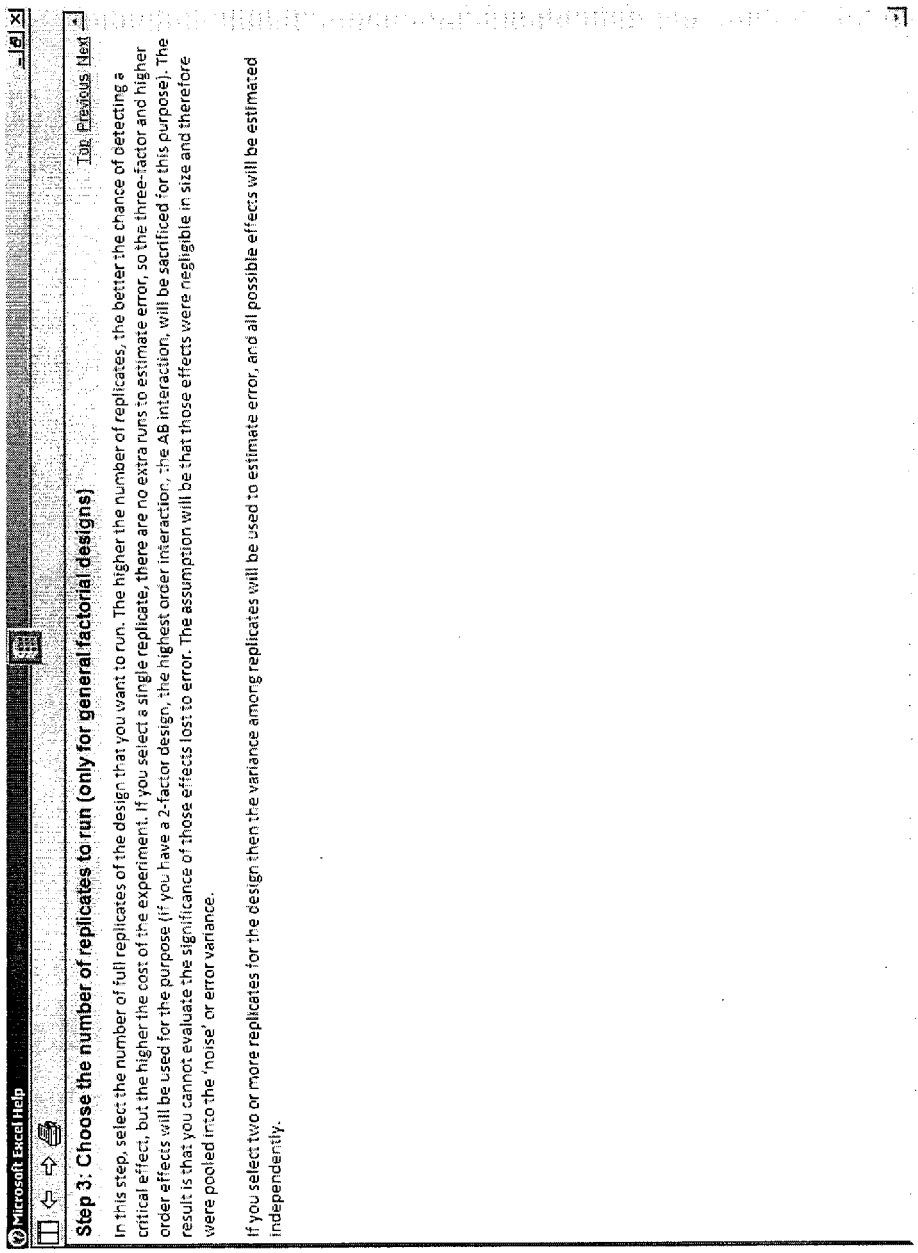
FIG. 9 is a process specific help screen displayed by the wizard.
Figure 10:
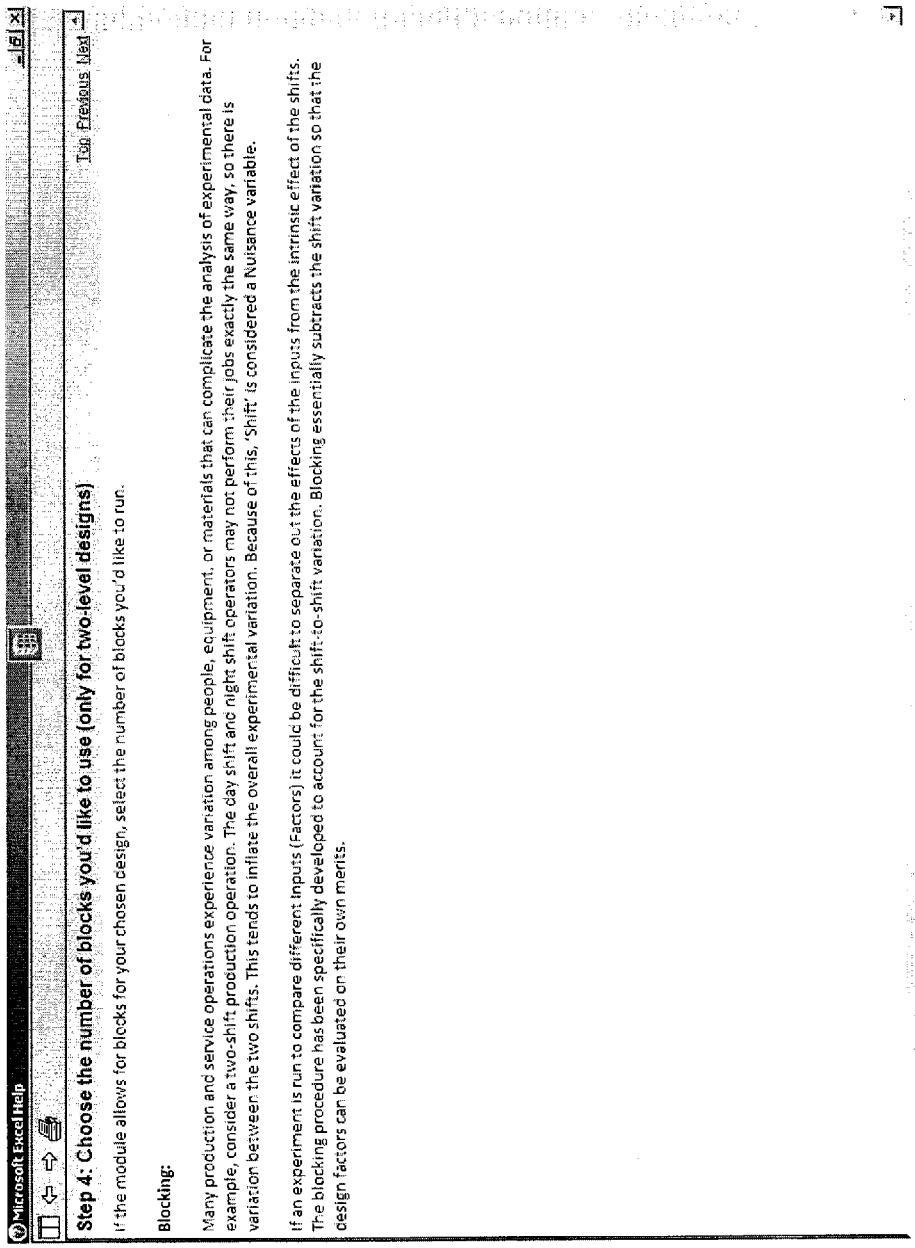
FIG. 10 is a process specific help screen displayed by the wizard.
Figure 12:
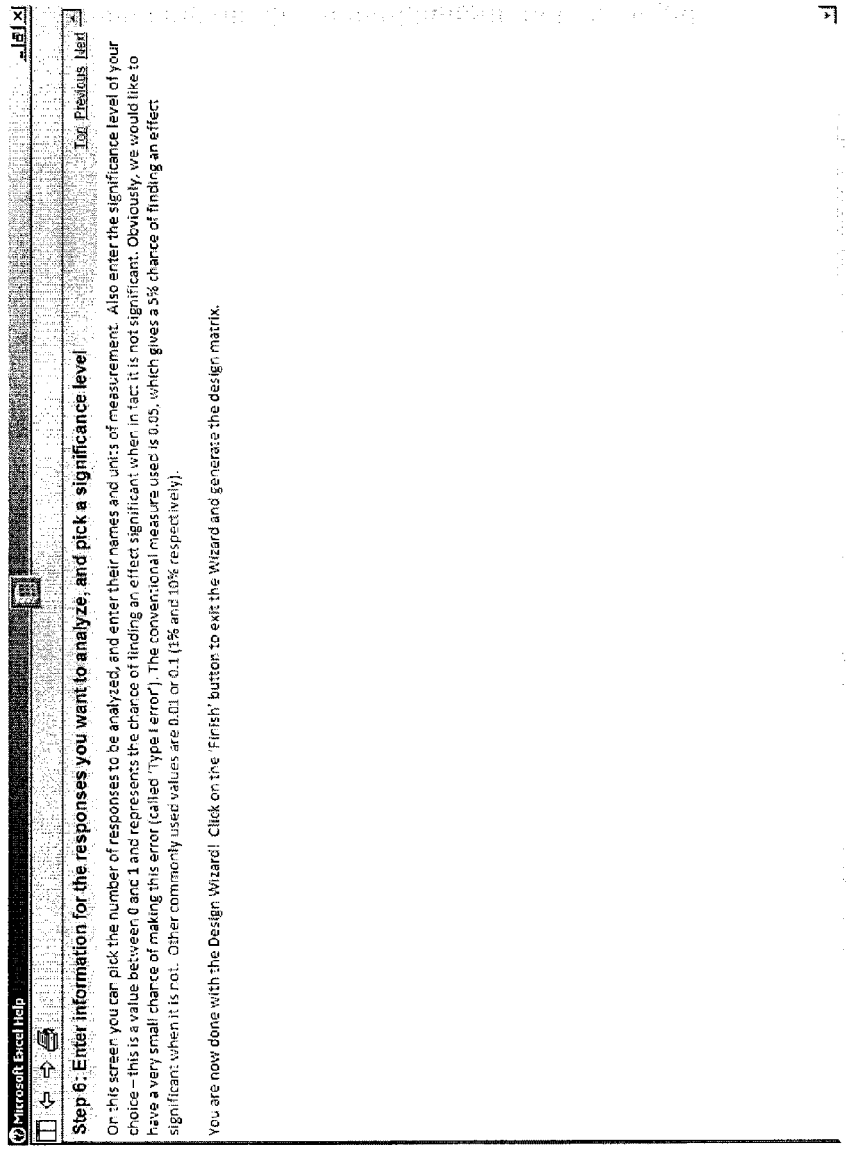
FIG. 12 is a process specific help screen displayed by the wizard.

Once the spreadsheet 200 has been completed, the user selects the design wizard function. FIGS. 3A and 3B show the operation of an embodiment of a DOE wizard. As shown in FIG. 4, the wizard provides a plurality of navigation buttons 405-430 and a progress bar 435 for each screen. Clicking an exit button 405 exits out of the wizard, deleting all previously entered data. Clicking a help button 410 opens a process specific help window with instructions for the particular portion of the DOE presently displayed by the wizard (FIGS. 5-12). Clicking a reset button 415 takes the user back to the start of the wizard, erasing all previously entered data. Clicking a back button 420 takes the user one screen back in the wizard. Clicking a next button 425 moves the user to the next screen. Clicking a finish button 430 causes the software to design the experiments based on the data entered into the wizard. The back button 420 is not available on a first screen 440. The next button 425 is only available when all necessary data has been entered for a particular screen of the wizard (the wizard provides default values in certain instances that do not need to be modified and some of the requested information is optional and need not be entered). The finish button 430 is only available when on the final screen of the wizard after all the necessary data has been entered. The progress bar 435 provides an indication of how far the user has progressed through the wizard.

The wizard provides two modes: (1) question and answer mode or (2) DOE map mode (see screen 440). The question and answer mode provides a high level of guidance to the user, asking questions for each step of design. The DOE map allows a user with more experience to select the type of experiments directly.

Figure 13:
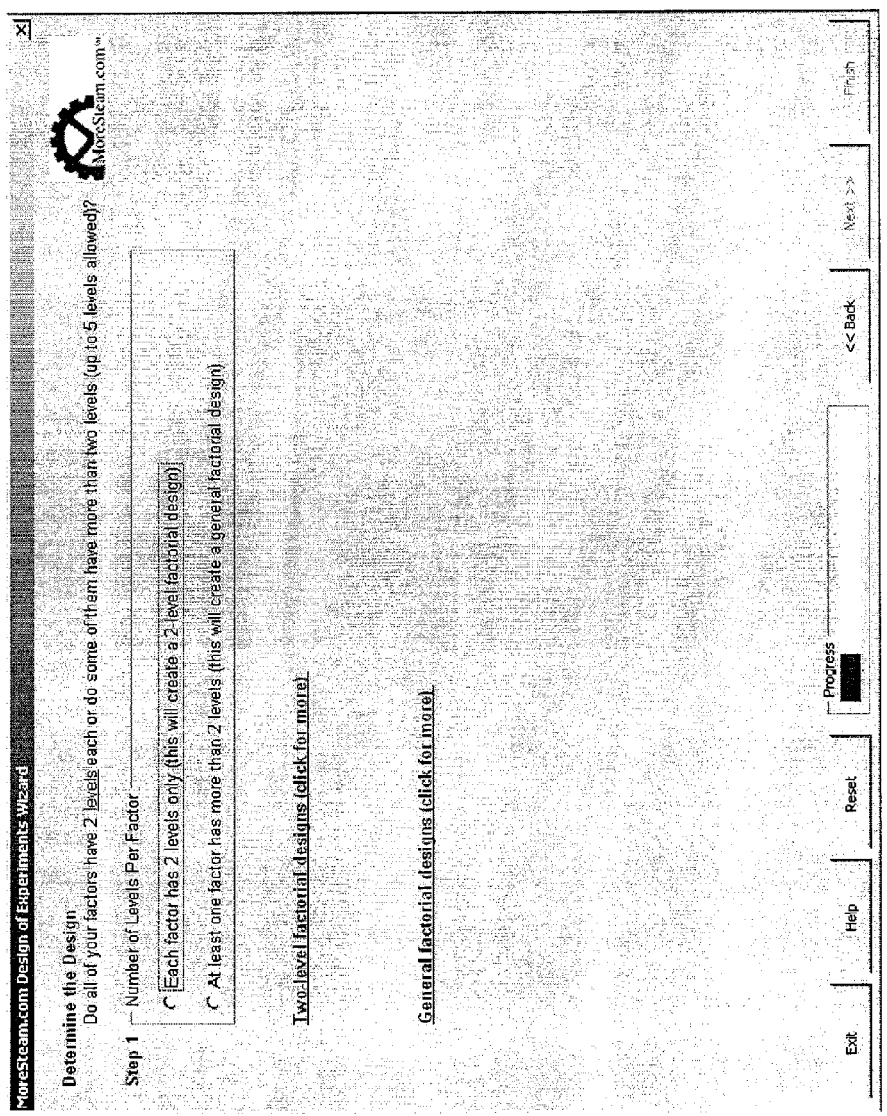
FIG. 13 is a user interface screen displayed by the wizard.
Figure 14:
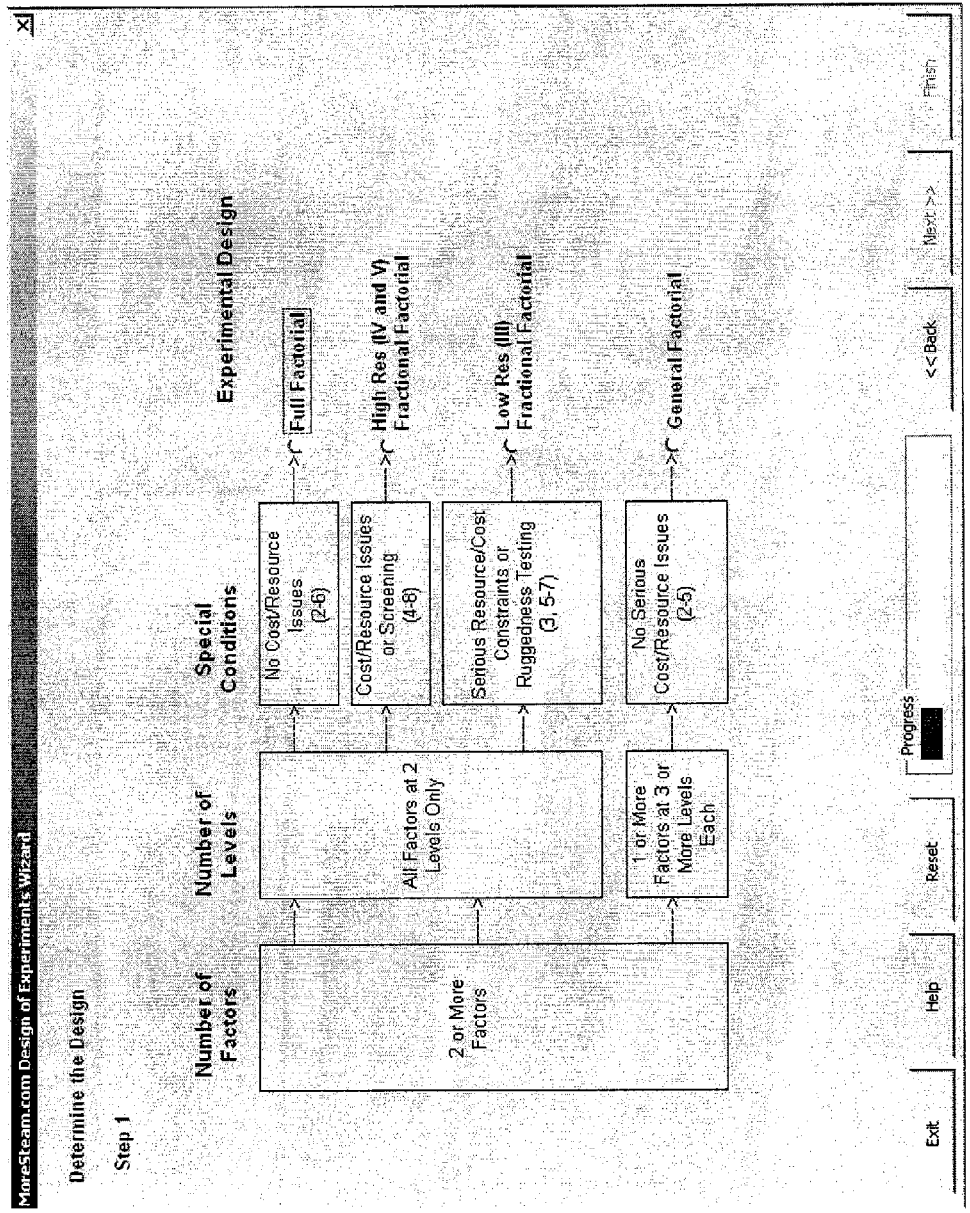
FIG. 14 is a user interface screen displayed by the wizard.

Referring back to FIG. 3A, if the user selects the question and answer mode (step 450), the wizard asks the user for the number of levels for each factor (step 455). The selections include only two levels for each factor or at least one factor having more than two levels (FIG. 13). If the user selects the DOE map mode (step 450), the user is presented with a map (FIG. 14) showing the available experiments and the criteria for each. The user selects a design of experiments from the map (step 460).

Figure 15:
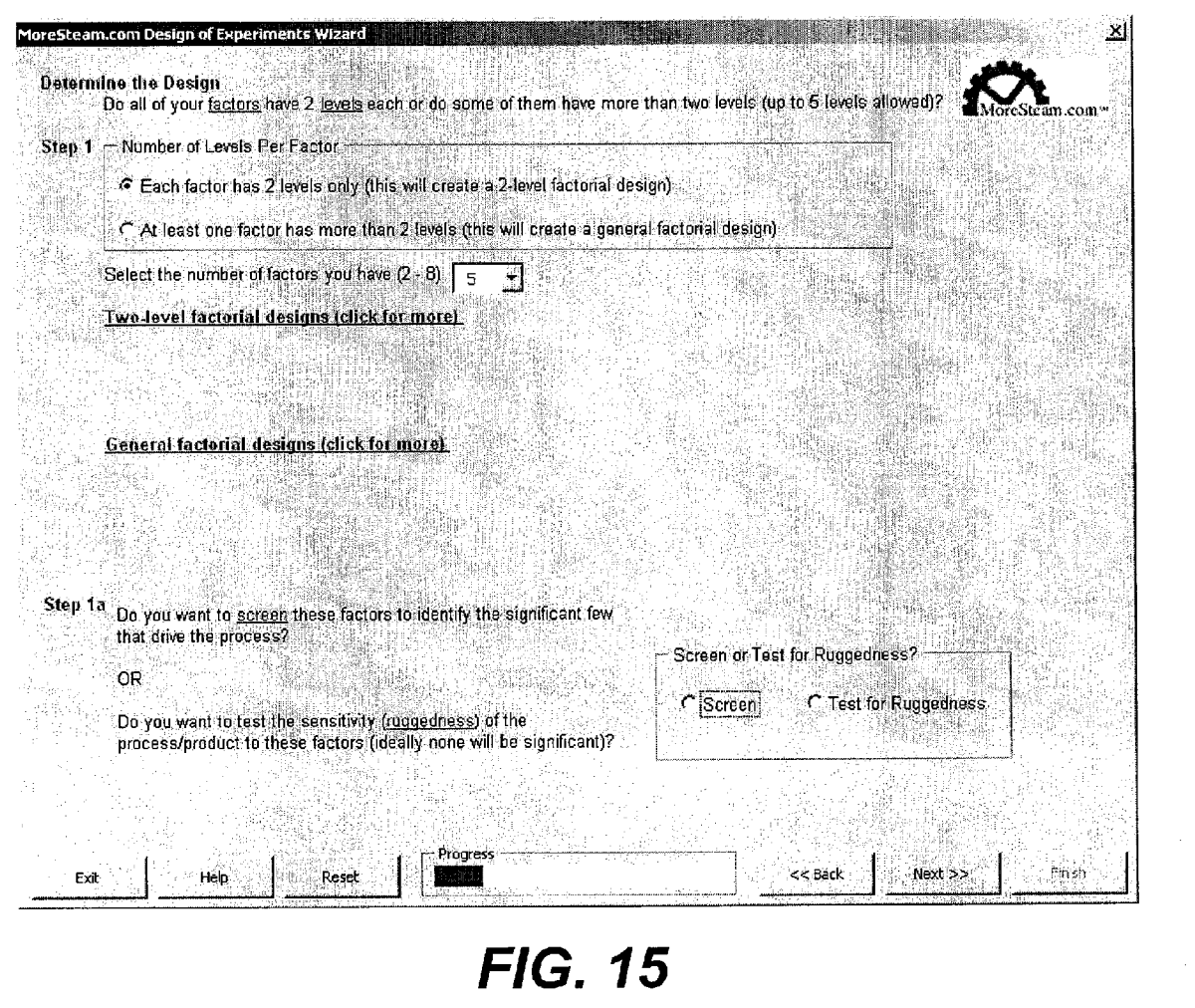
Figure 16:
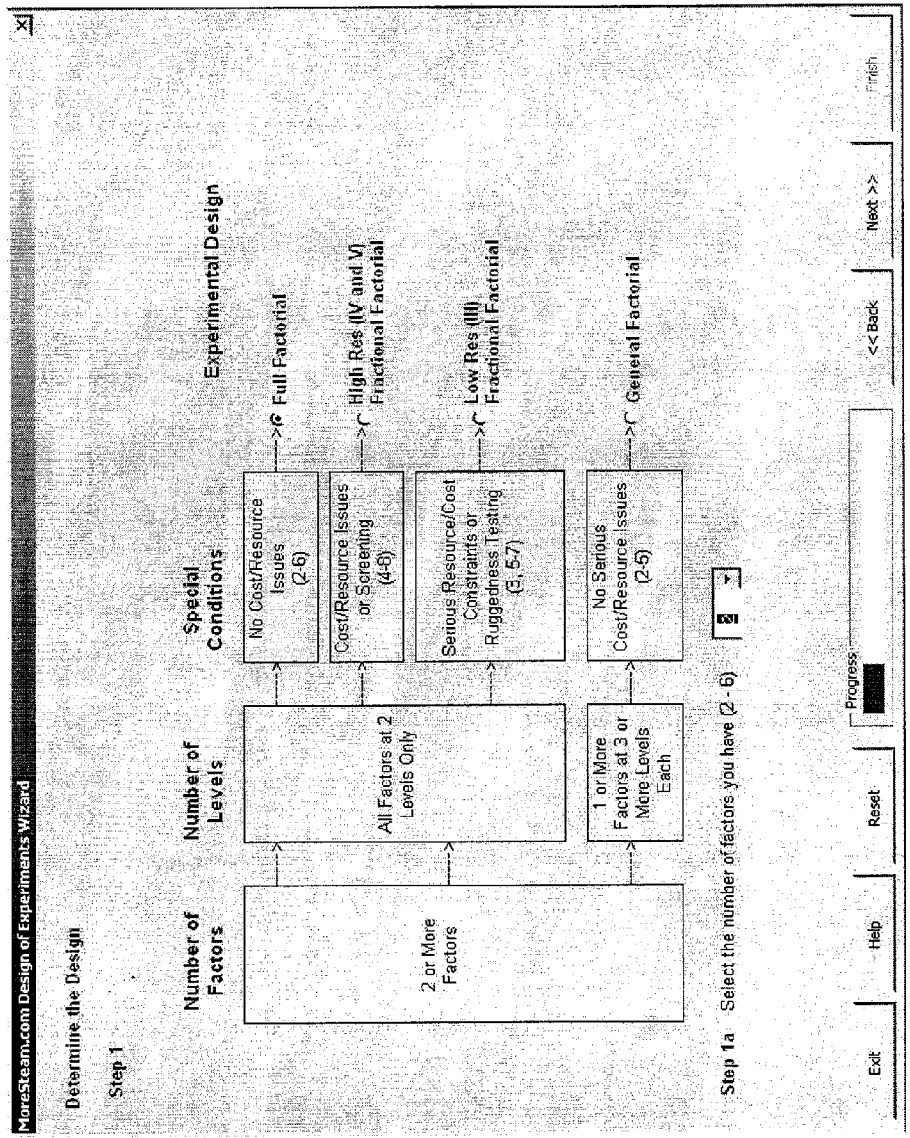
FIG. 16 is a user interface screen displayed by the wizard.

If the user selects the only two levels per factor option in the question and answer mode (step 455) or selects the full factorial, high resolution fractional factorial, or low resolution fractional factorial experiments in the DOE map mode (step 465), the wizard continues with requesting the user to enter the number of factors to be used in the experiments (step 470) (see FIG. 15 for the question and answer mode and FIG. 16 for the DOE map mode). If the user selected five or more factors (step 472) the wizard prompts the user to select whether the experiments are for screening or testing ruggedness (step 473) (if the user selects four or less factors, this selection input is not provided). Screening is an economical experiment designed to examine a large number of possible factors to determine which of the factors might have the greatest effect on the outcome of the test (generally using high resolution fractional factorial design). Testing for ruggedness is an economical experiment designed to establish the ruggedness of a process to a large number of factors. This often involves the destructive testing of parts and typically only evaluates possible main effects (generally using low resolution fractional factorial design).

Figure 17A:
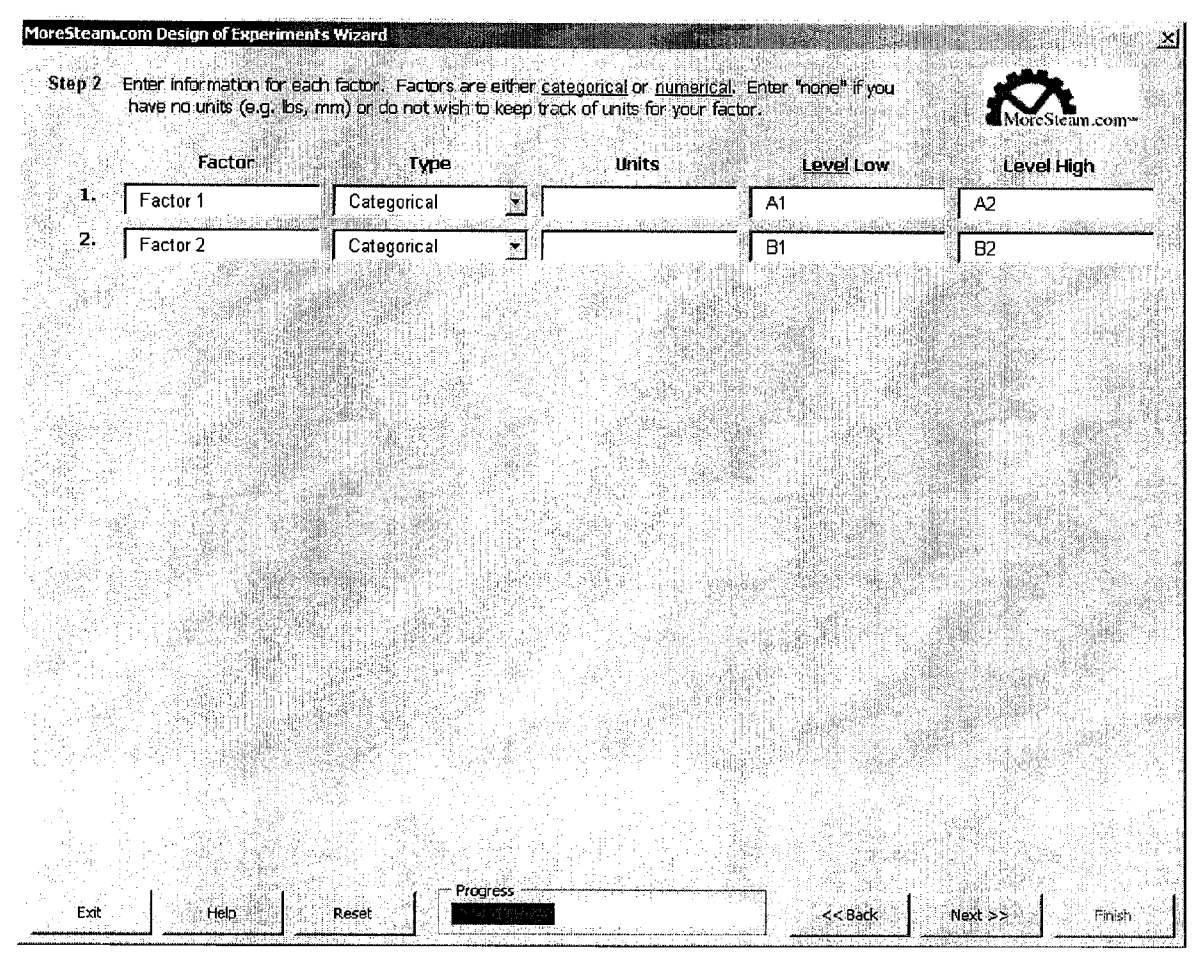
Figure 17B:
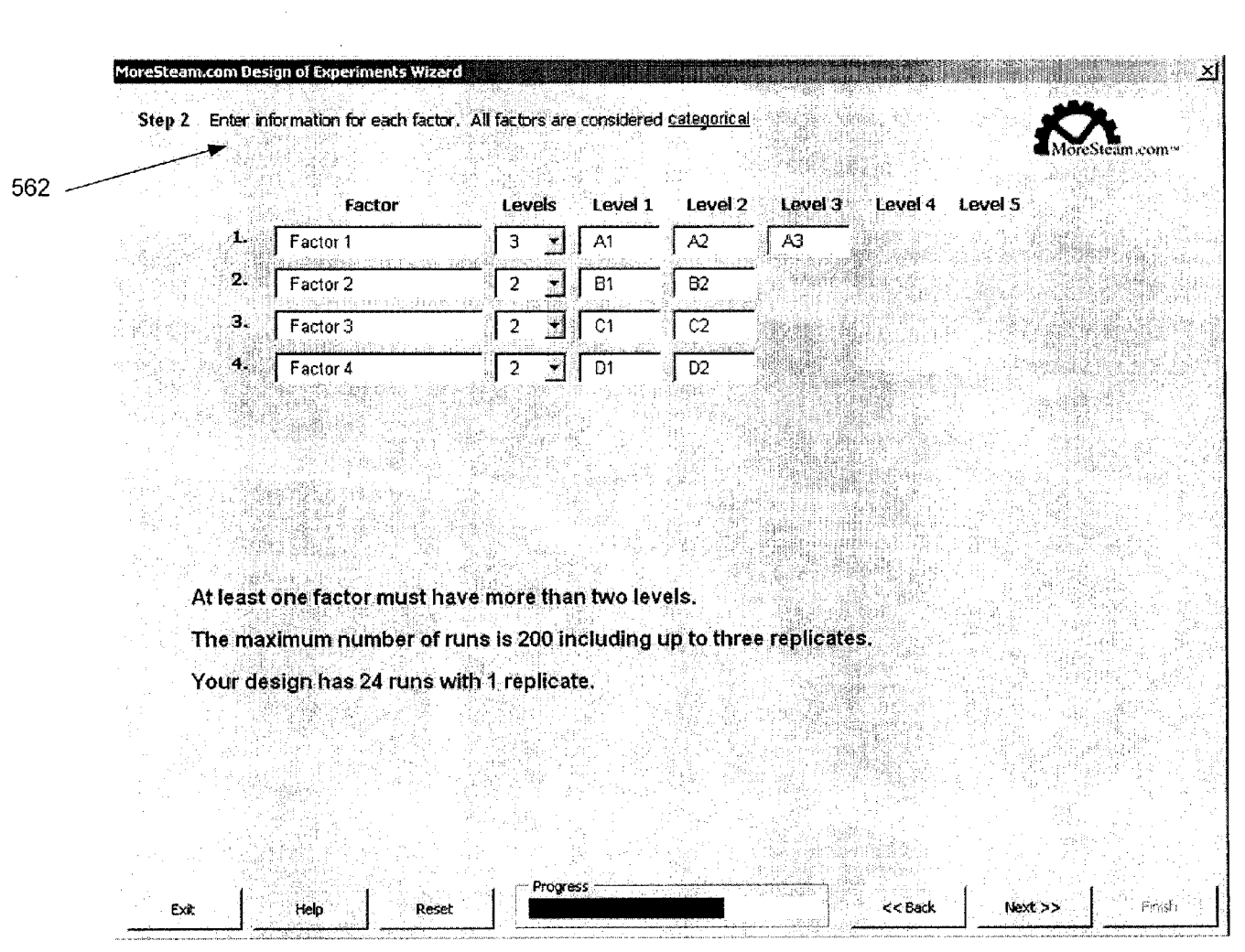

Next the user is presented with a screen having boxes for entering a name, a type, a unit type, a first level, and a second level for each of the factors chosen at step 470 (step 475) (FIG. 17A). The user is able to select the type of each factor as "categorical" or "numerical." A categorical factor has a discrete number of values based on categories or groups. For example, a factor for location could be limited to east and west. A numerical factor has the possibility of a range of numeric values. For example, a factor for temperature theoretically has an infinite number of values within a range.

Figure 18:
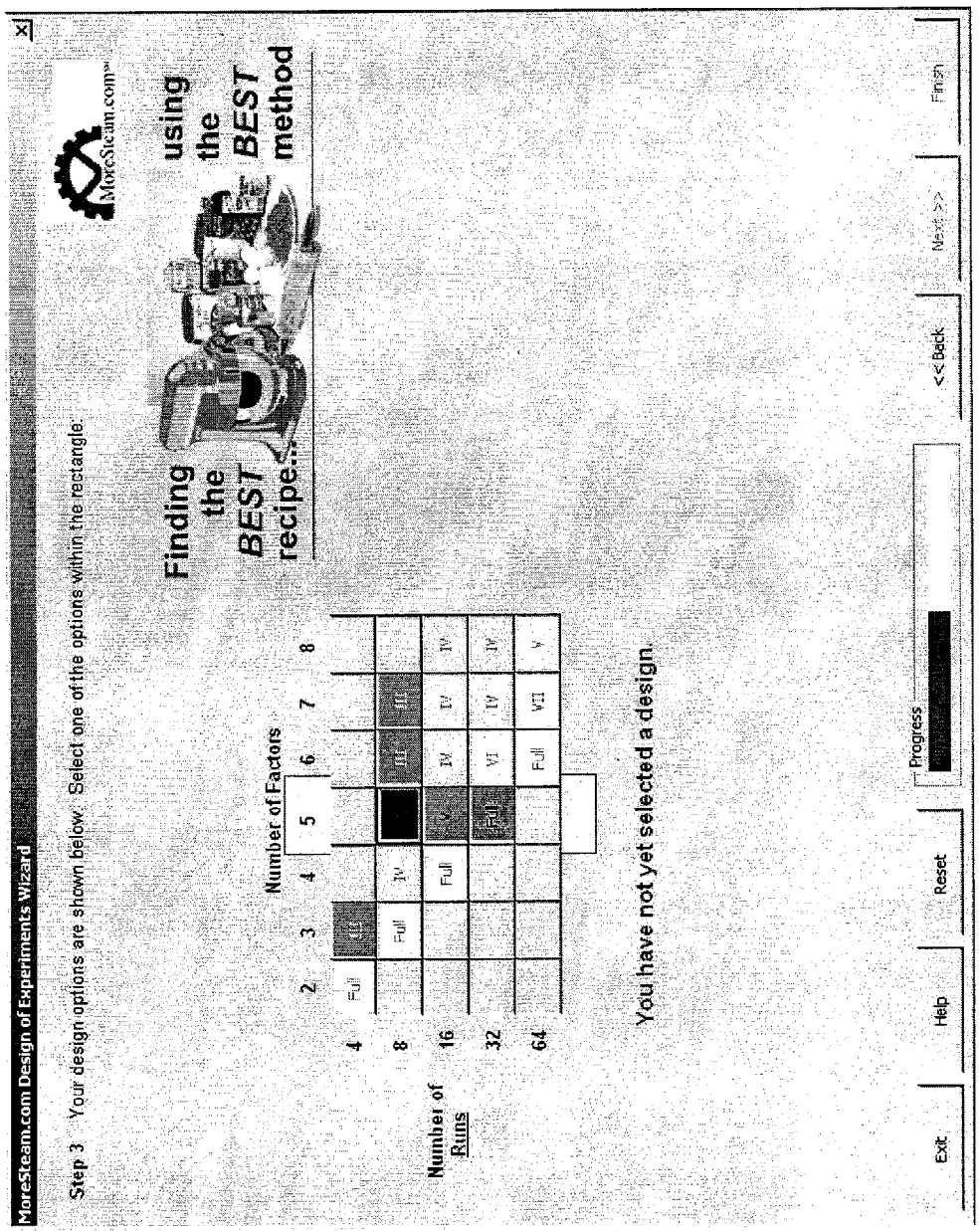
FIG. 18 is a user interface screen displayed by the wizard.
Figure 19:
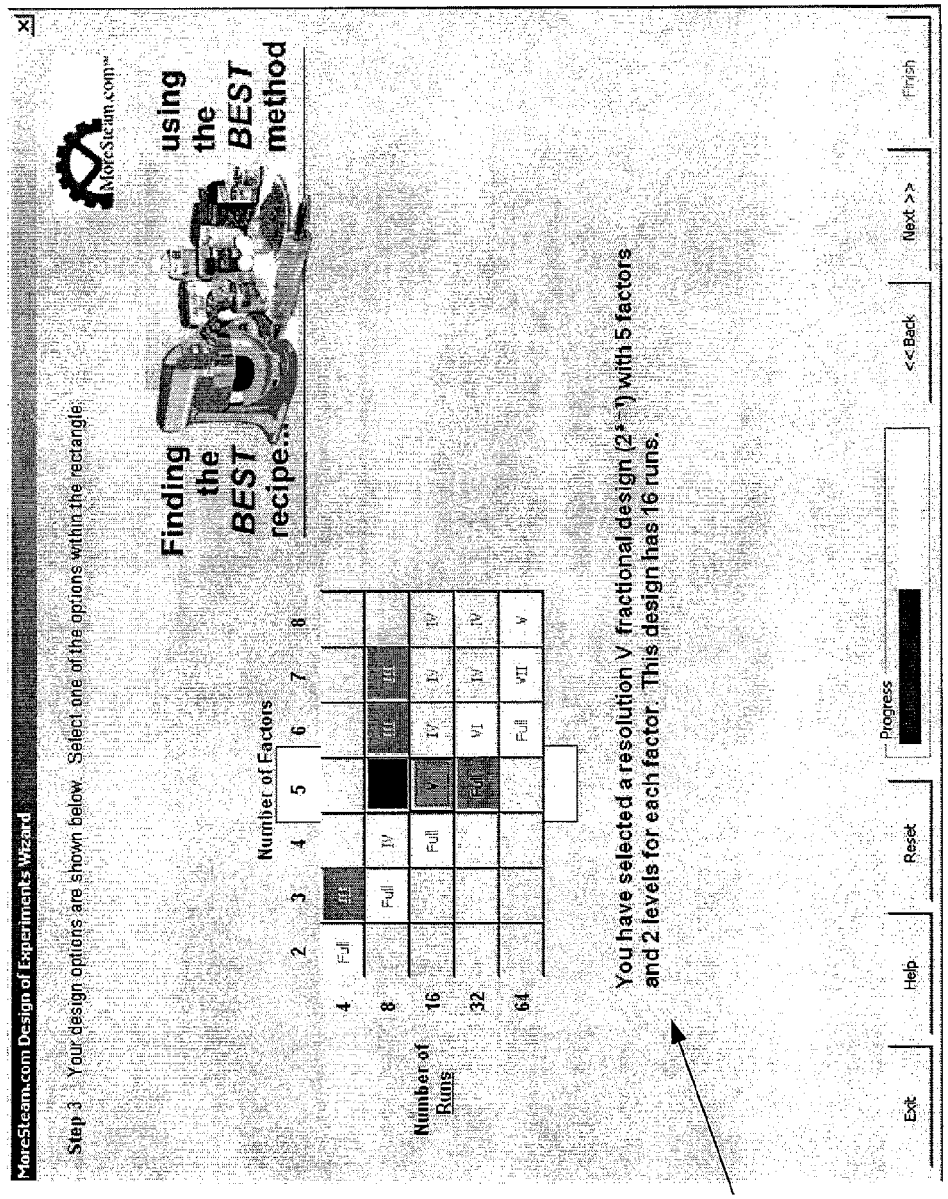
FIG. 19 is a user interface screen displayed by the wizard.

Next, the user is presented with a grid (FIG. 18). In the question and answer mode, the grid allows the user to select the number of runs to be executed for the experiments (step 480). This essentially selects the design of experiments from the full factorial, high resolution fractional factorial, or low resolution fractional factorial experiment designs. The grid allows the user to select the number of runs for the previously entered number of factors. For example, in FIG. 18, the user had selected five factors, and is able to choose runs of 8, 16, or 32 (highlighted in the rectangle). In the DOE map mode, the user previously selected the type of experiments. Therefore, only one selection is available in the grid. When the type of experiments is selected, a verification 482 of the type of experiments is shown below the grid (FIG. 19). In some embodiments, the wizard allows only a low resolution fractional factorial design when the user selects ruggedness testing. In some embodiments, the wizard only allows a high resolution fractional factorial design when the user selects screening.

Figure 20:
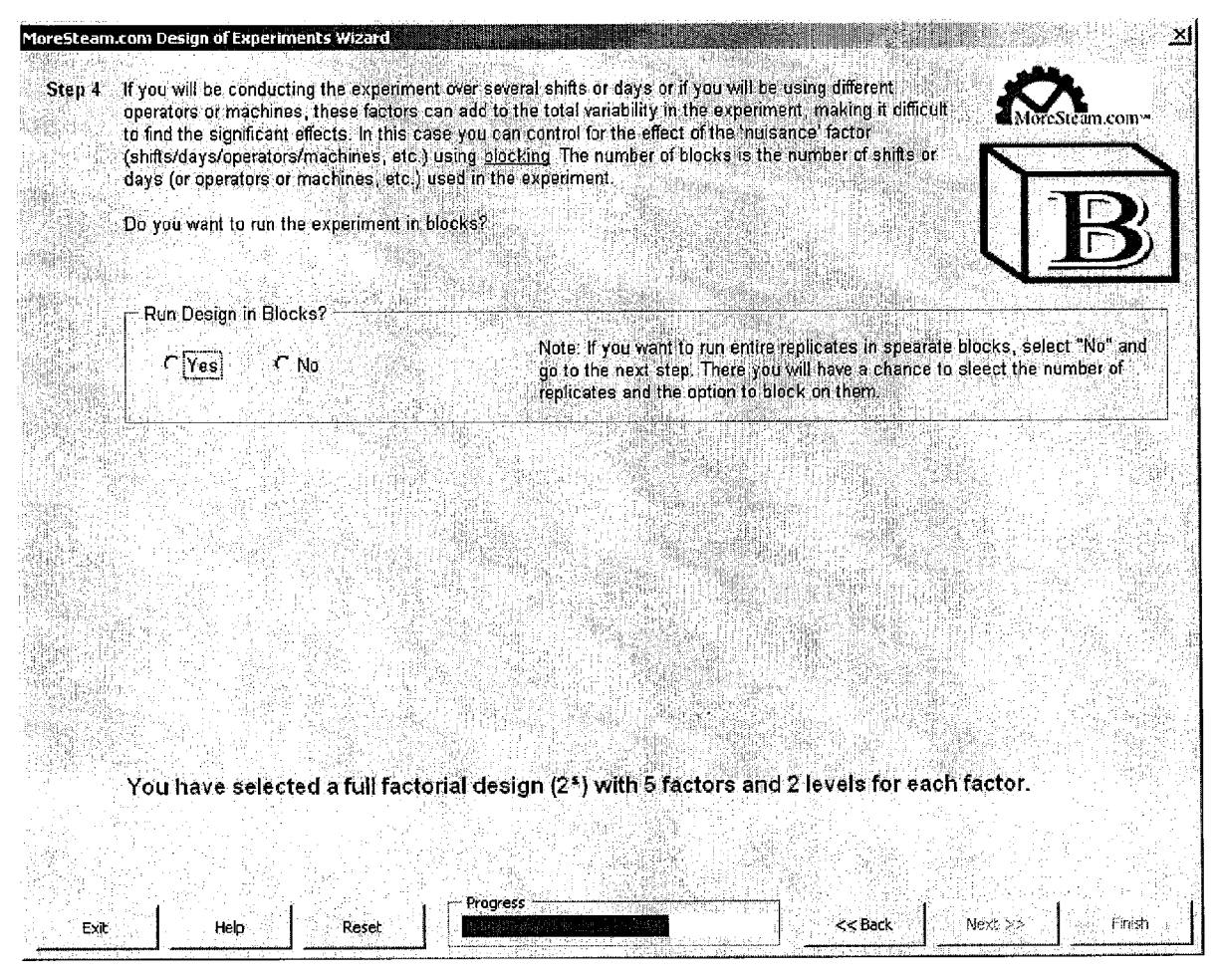
Figure 21:
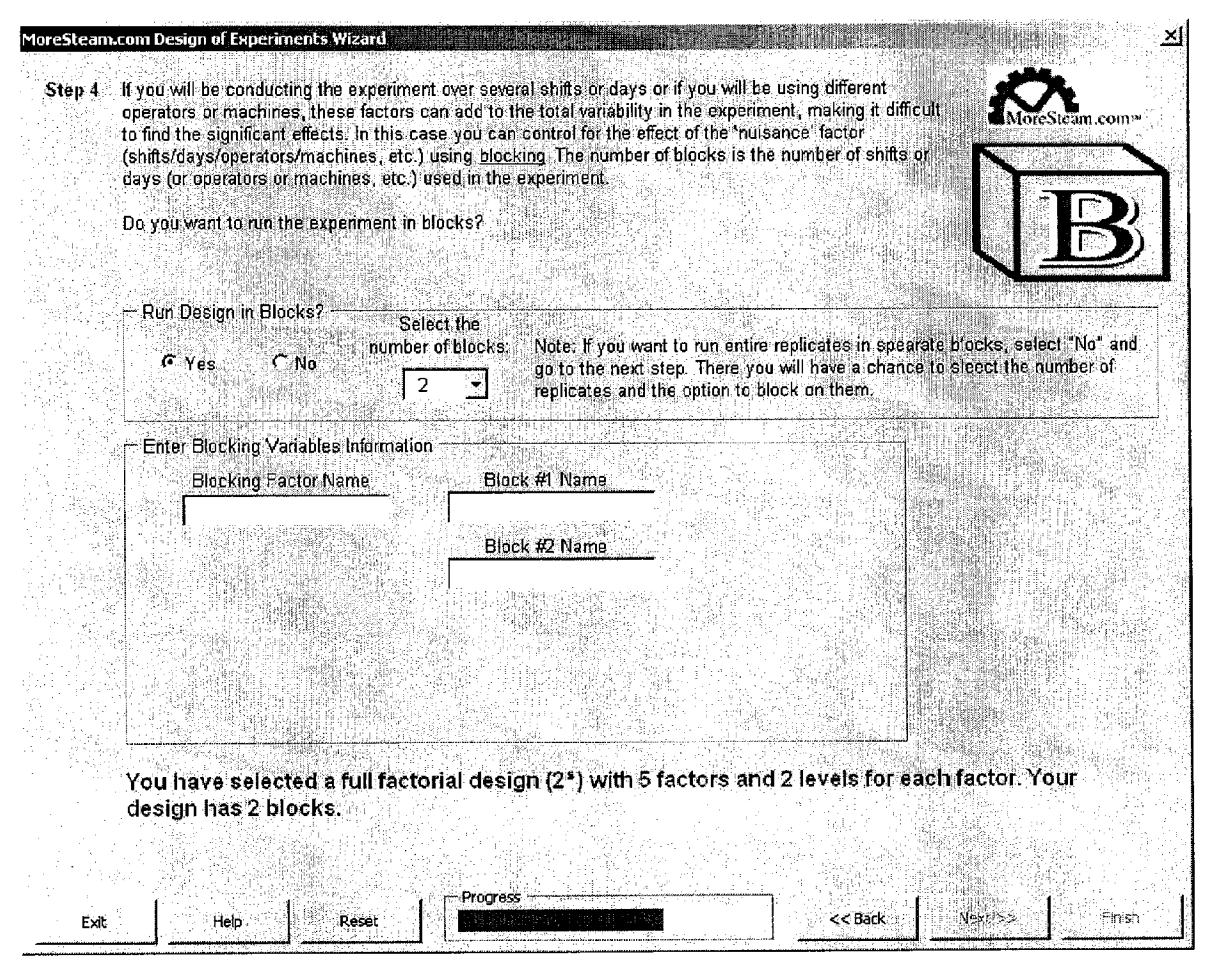

Next, if available for the particular design chosen, the user is prompted to select whether to use blocks for the test or not (step 485) (FIG. 20). If the user elects to use blocks, the wizard prompts the user to enter the number of blocks to use, the blocking factor name, and the name of each block (step 490) (FIG. 21).

Figure 23:
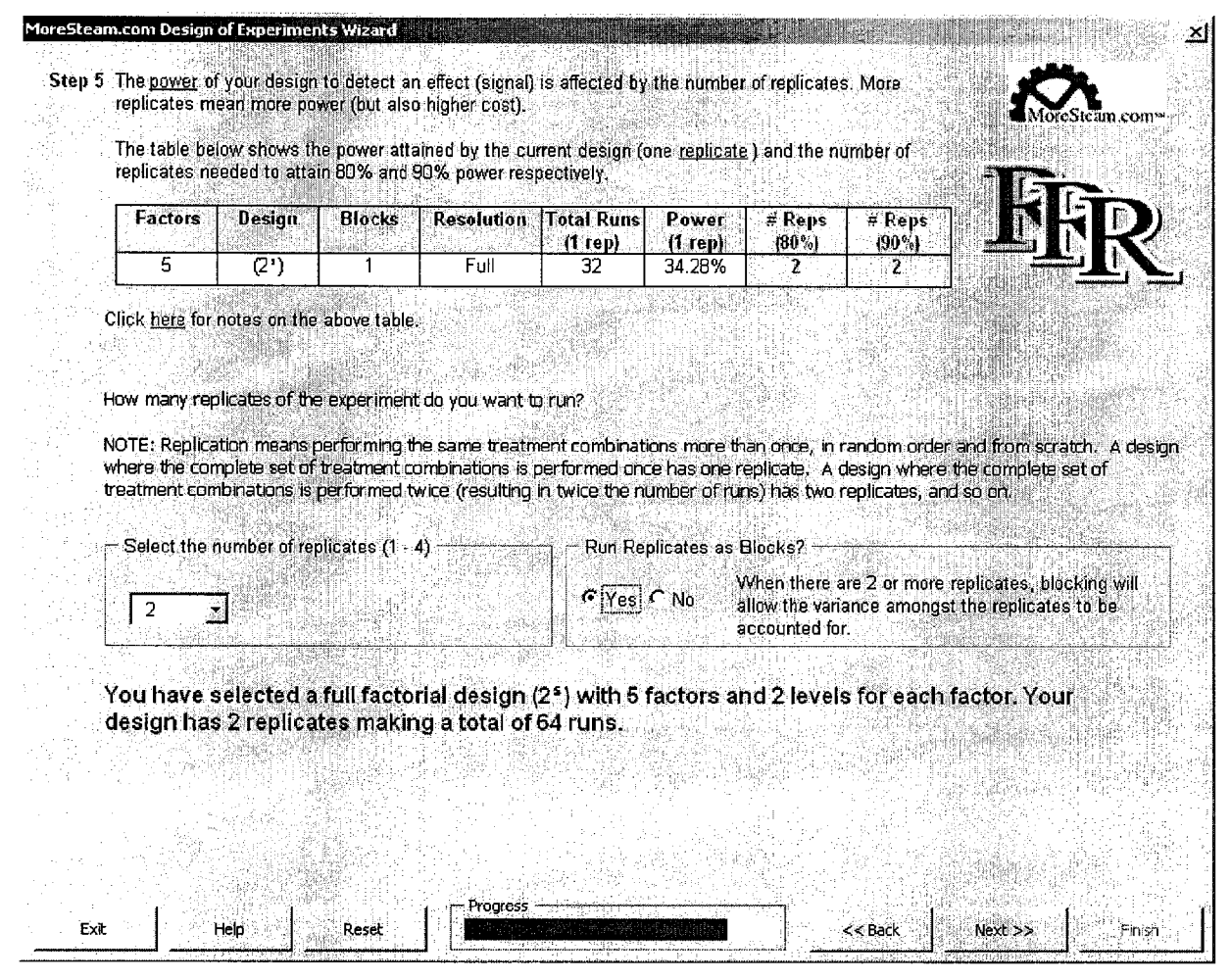

In the next screen (FIG. 22), the user is provided with data about the chosen experiments including the power 500. The wizard also shows how many replicates are required to raise the power to 80% 505 and 90% 510. The wizard prompts the user to enter the number of replicates the user desires (step 515). If at step 485, the user had selected not to enter blocks, the wizard moves directly to the replicates screen (FIG. 22) (step 520). If the user selects two or more replicates after having not selected blocks (step 525), the wizard asks whether the user wishes to run the replicates in blocks (step 530) (FIG. 23).

On the next screen (FIG. 24), the user is prompted to select the number of responses for the experiments and is then able to enter a name and type of units for each response (step 535). Finally, the user is prompted to enter a significance level (step 540). Once the significance level is selected, the finish button is highlighted and the user clicks on the finish button to design the experiments (step 545).

If in the question and answer mode at step 455 the user selected more than two issues or in the DOE map mode the user selected full factorial, the wizard prompts the user to enter the number of factors (step 550). If the user selects five or more factors (step 552) the wizard prompts the user to select whether the experiments are for screening or testing ruggedness (step 553) (if the user selects four or less factors, the selection input is not provided).

Figure 25:
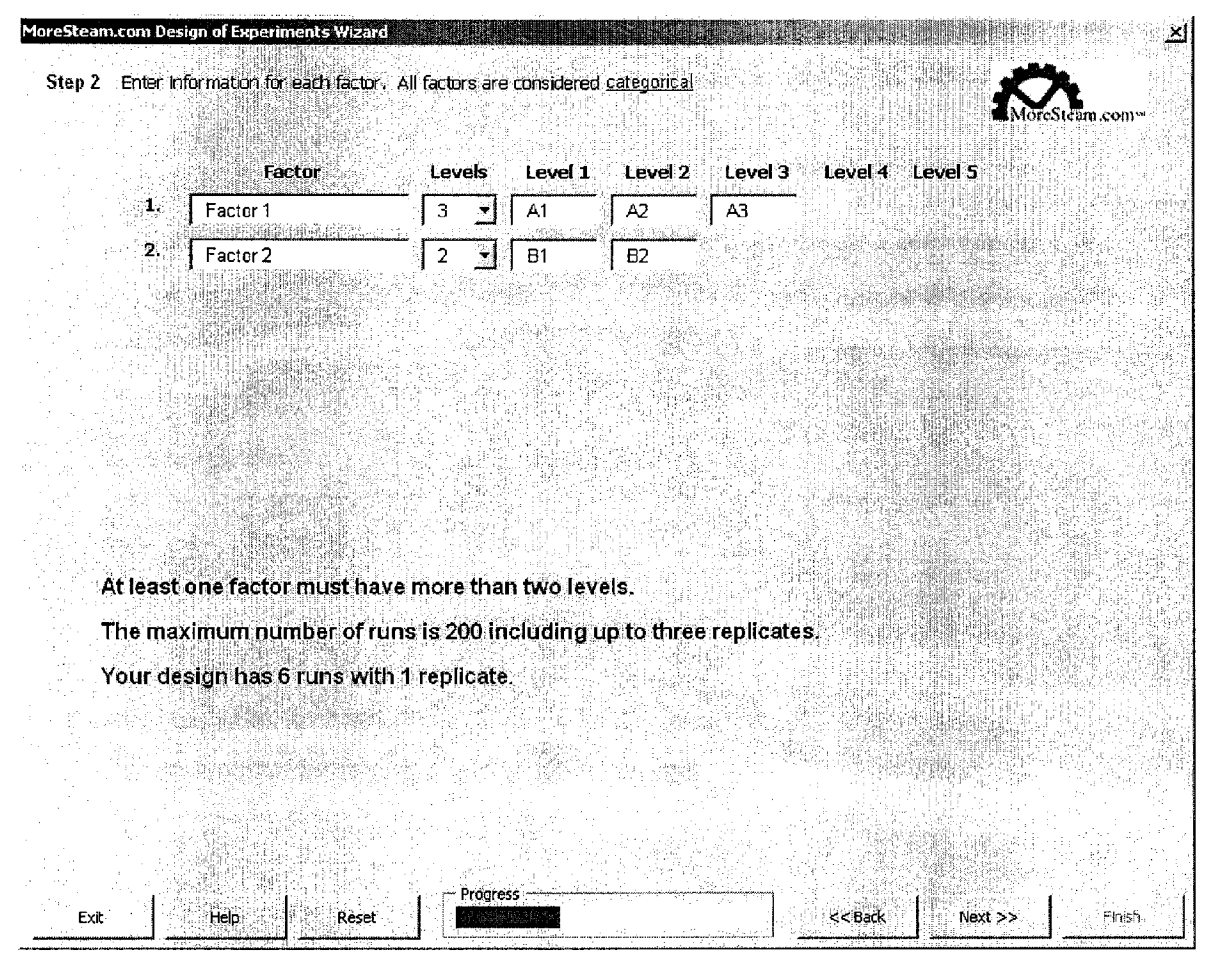

Next the wizard prompts the user for the number of levels for each factor (step 555), and the factor and level information (step 560) (FIG. 25). Where three or more levels are used, unlike the factor information for factors with only two levels, the wizard limits the type of factor to categorical. A confirmatory notification 562 indicates this to the user (see FIG. 17B).

Figure 26:
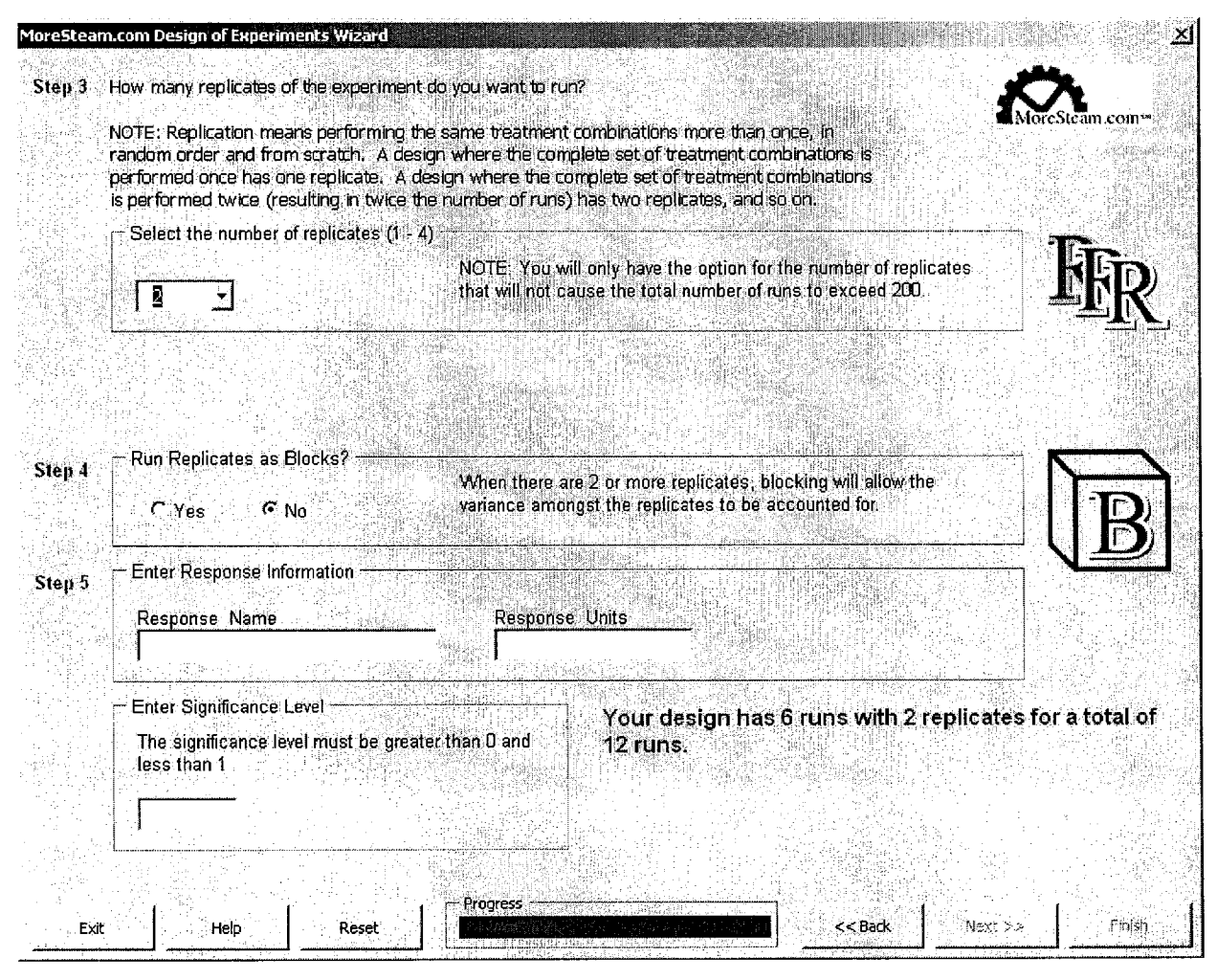

Next, in FIG. 26, the wizard prompts the user for the number of replicates (step 565), and if the replicates are greater than one, allows the user to select blocking (step 570). The user is then prompted to select the number of responses for the experiments and is then able to enter a name and type of units for each response (step 575). Finally, the user is prompted to enter a significance level (step 540). Once the significance level is selected, the finish button is highlighted and the user clicks on the finish button to design the experiments (step 545).

Figure 27:
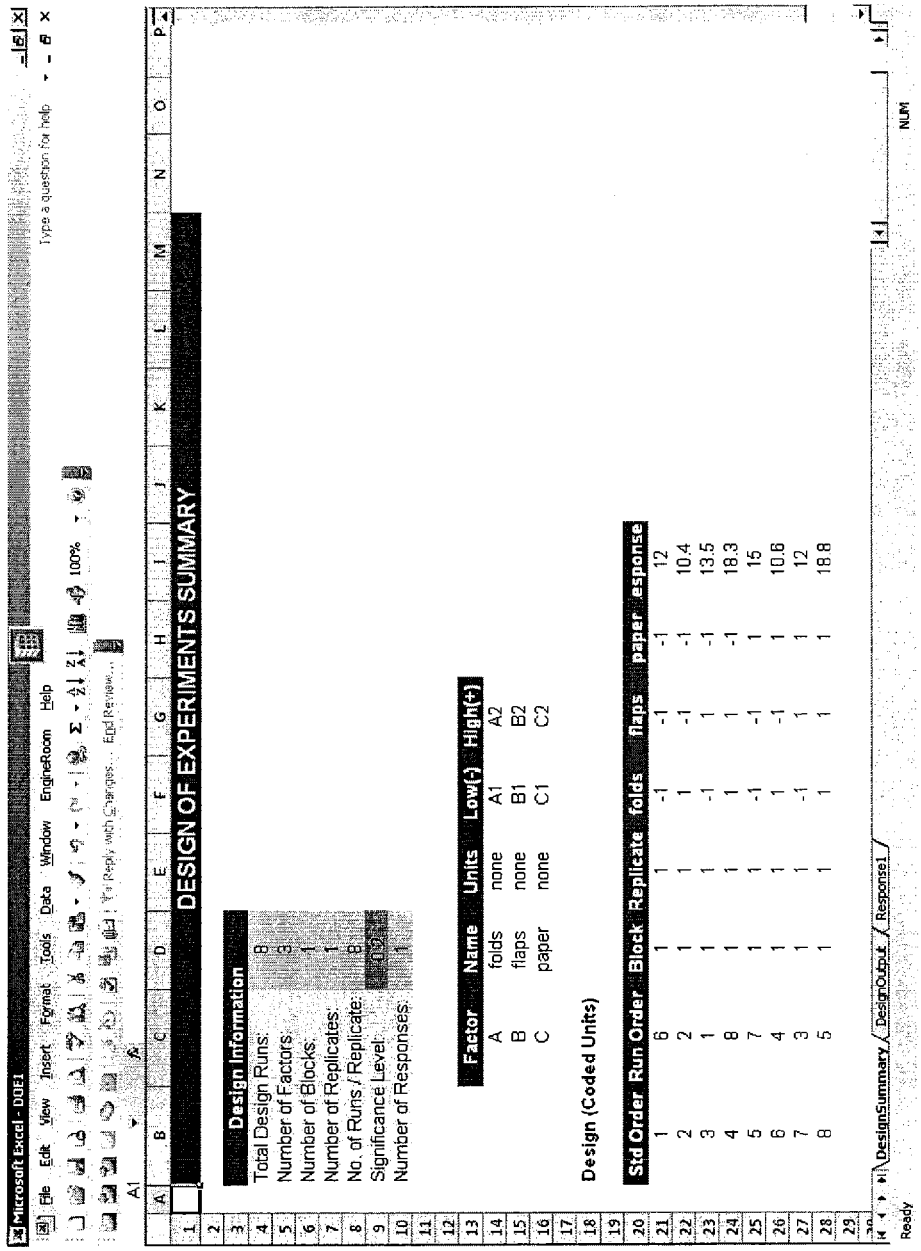
FIG. 27 is a design of experiments summary screen generated by the wizard.
Figure 28:
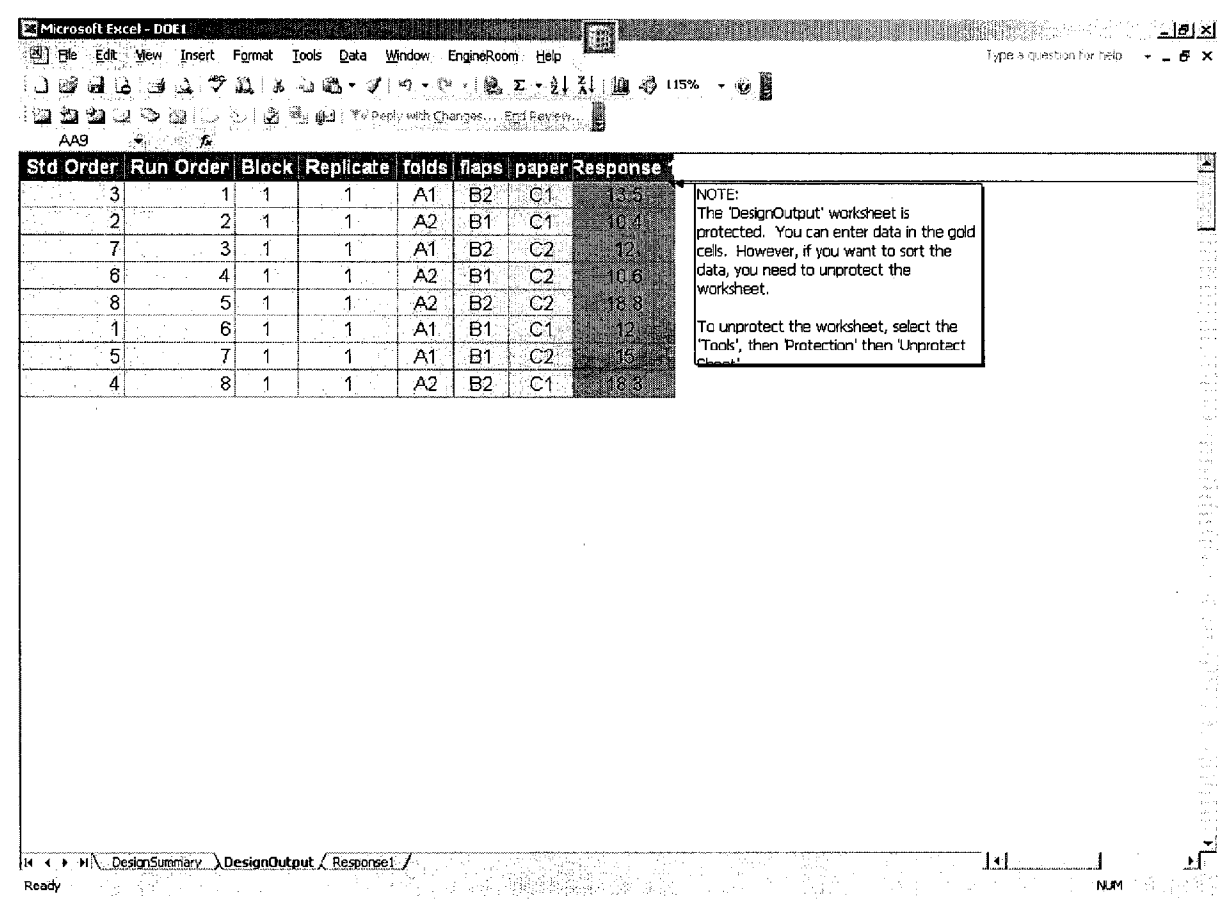
Figure 29:
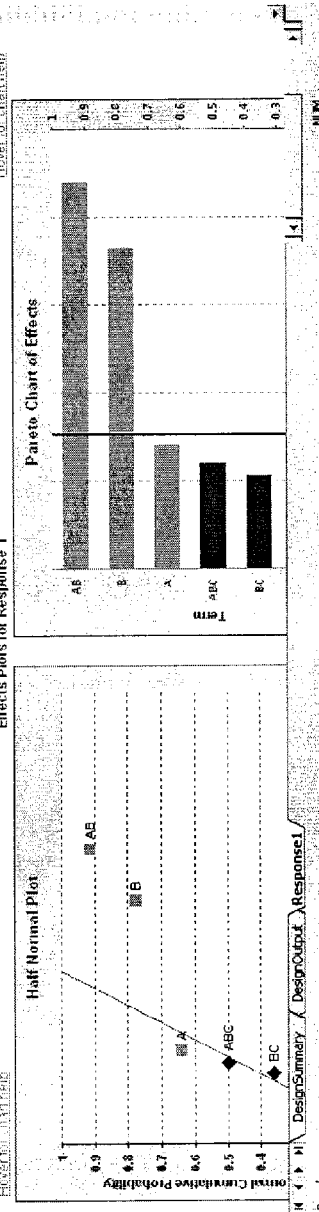
FIG. 29 is a portion of analysis results spreadsheet generated by the software program.
Figure 30:
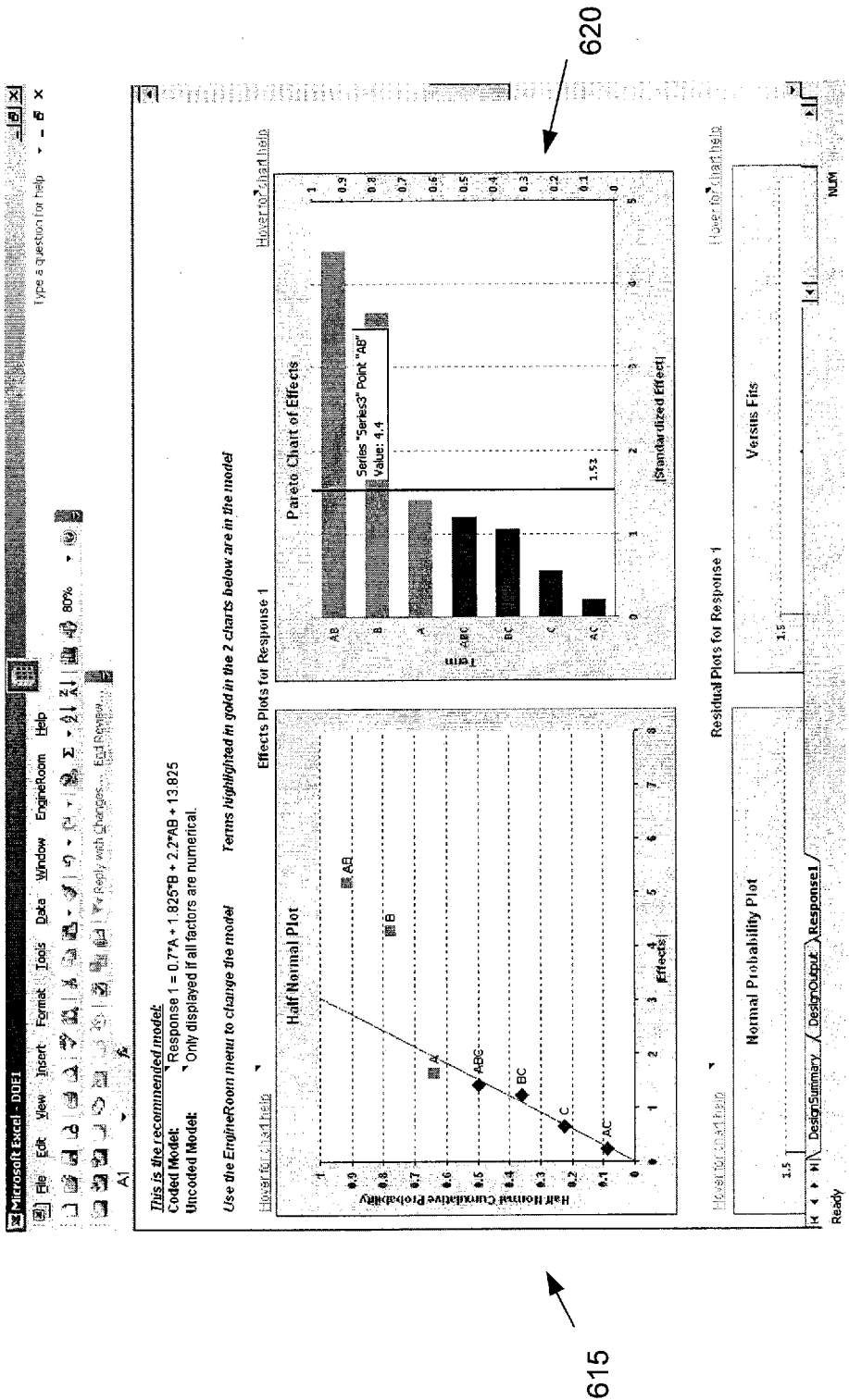
FIG. 30 is a portion of analysis results spreadsheet generated by the software program.
Figure 31:
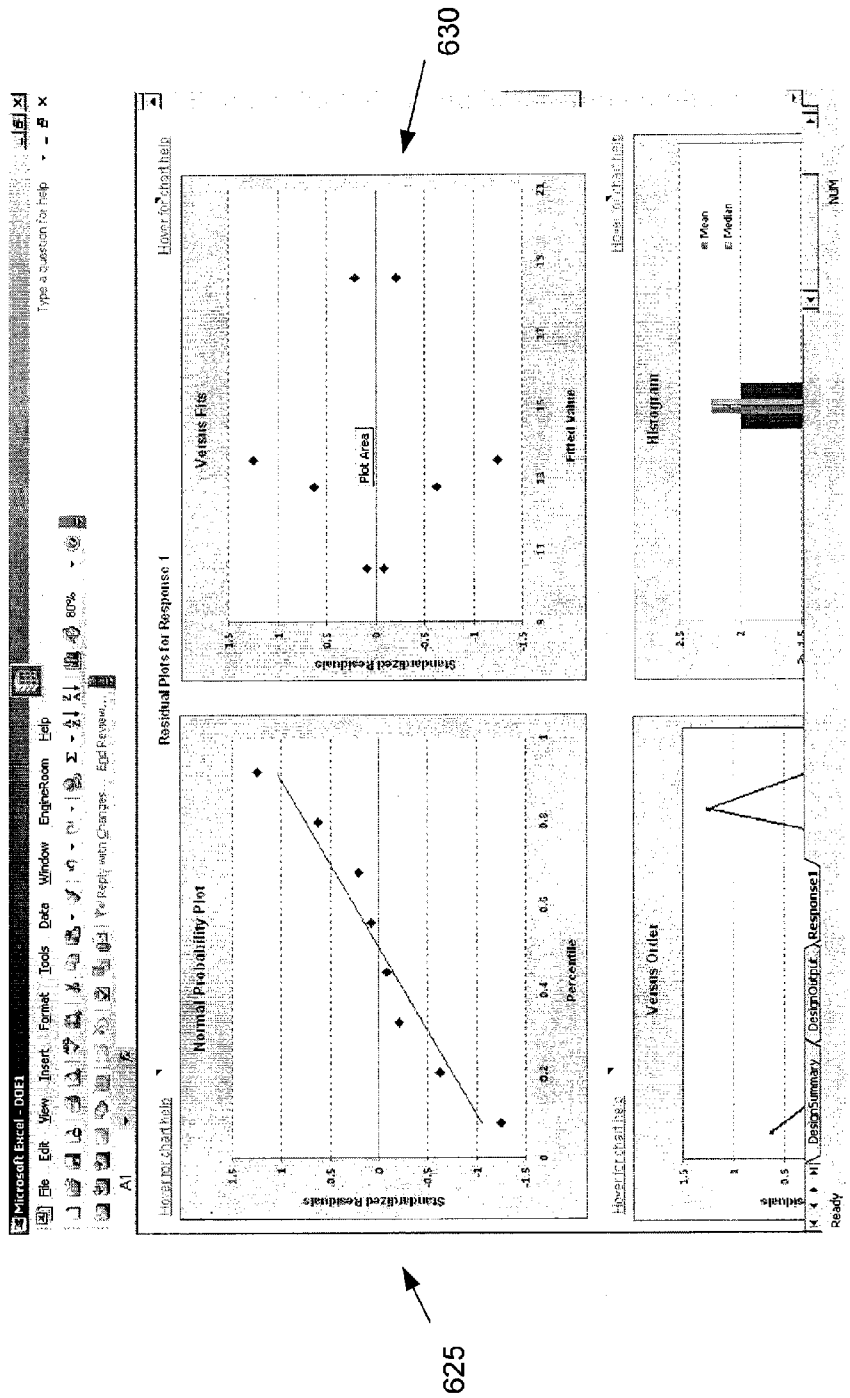
FIG. 31 is a portion of analysis results spreadsheet generated by the software program.
Figure 32:
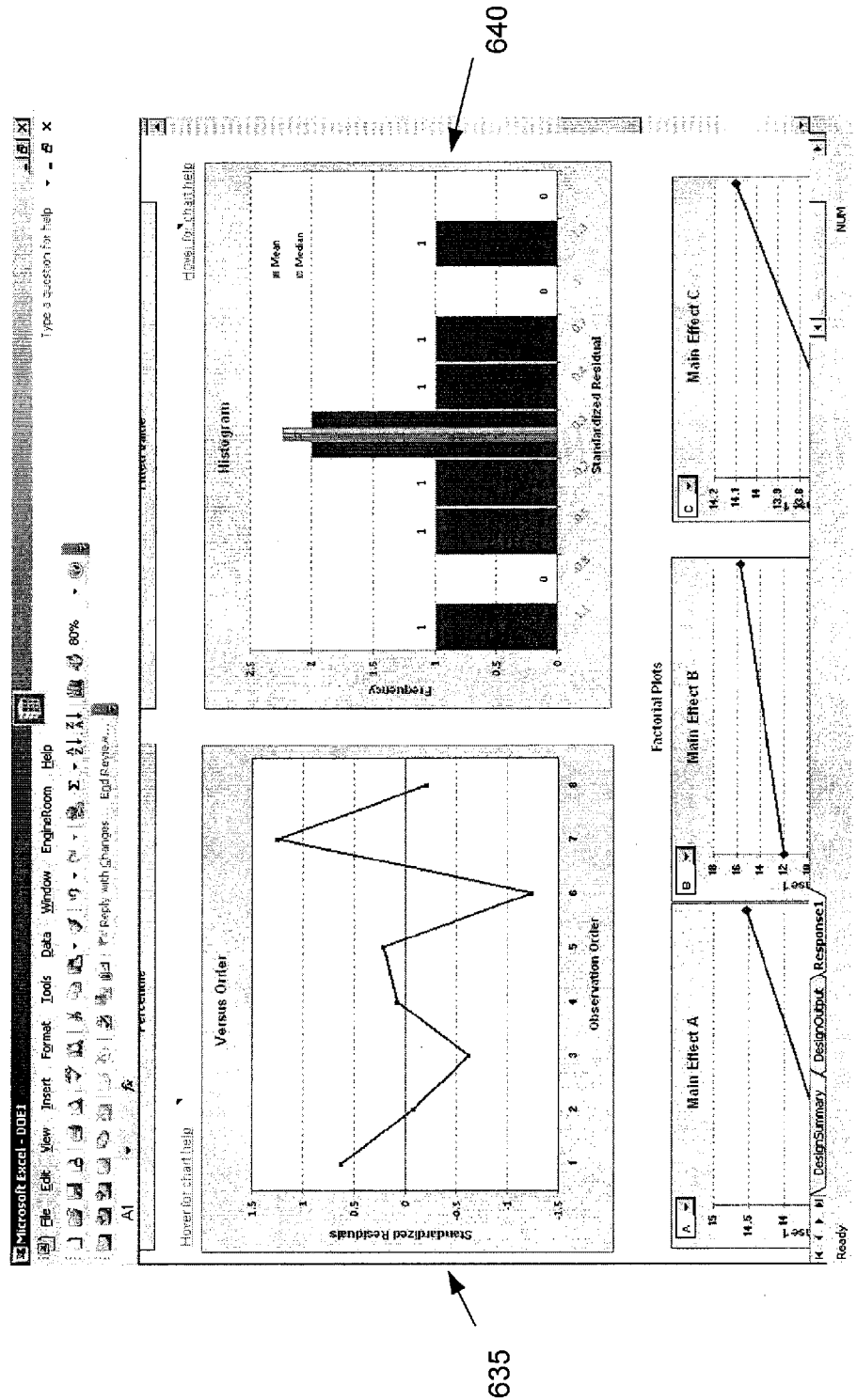
FIG. 32 is a portion of analysis results spreadsheet generated by the software program.
Figure 33:
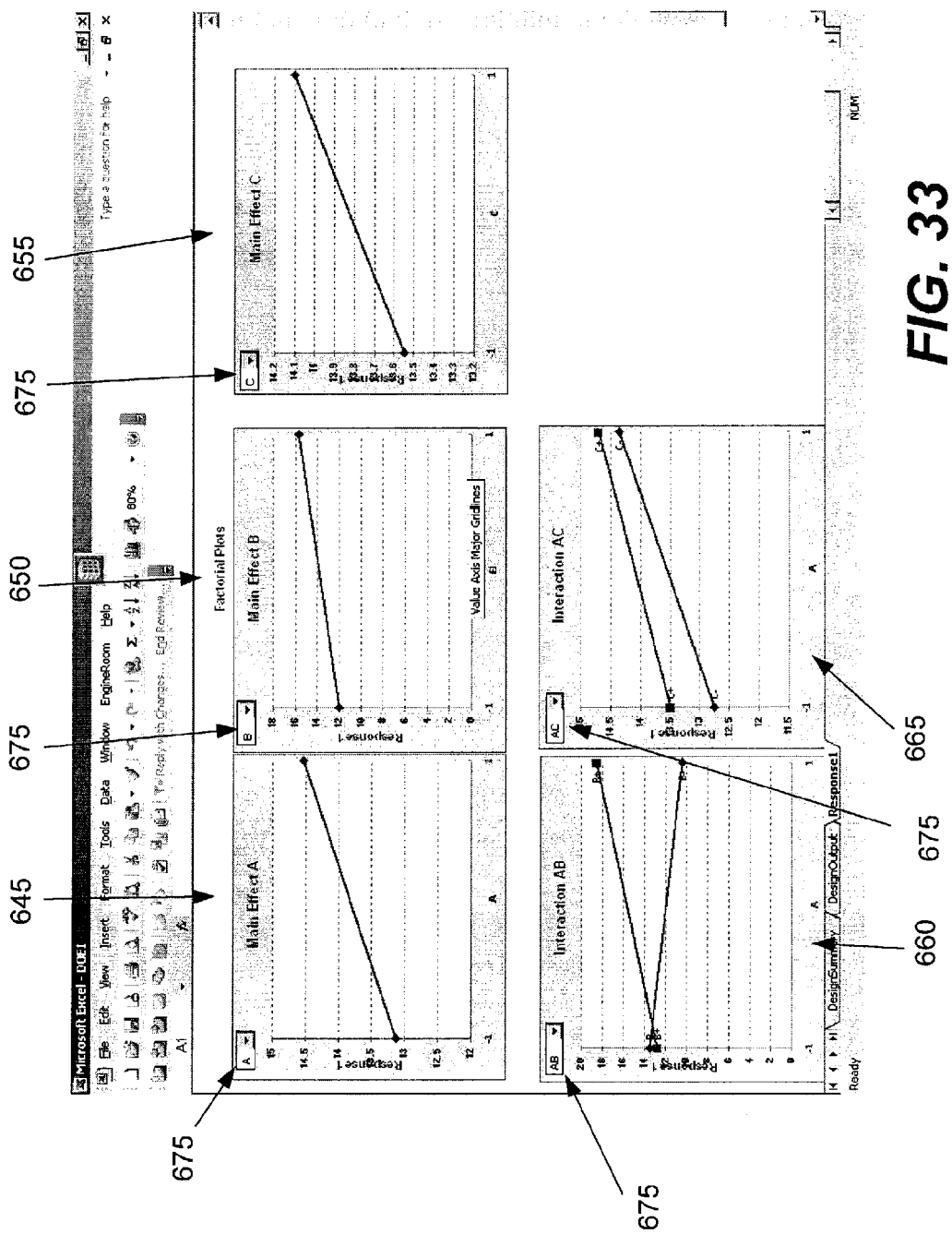
FIG. 33 is a portion of analysis results spreadsheet generated by the software program.
Figure 34:
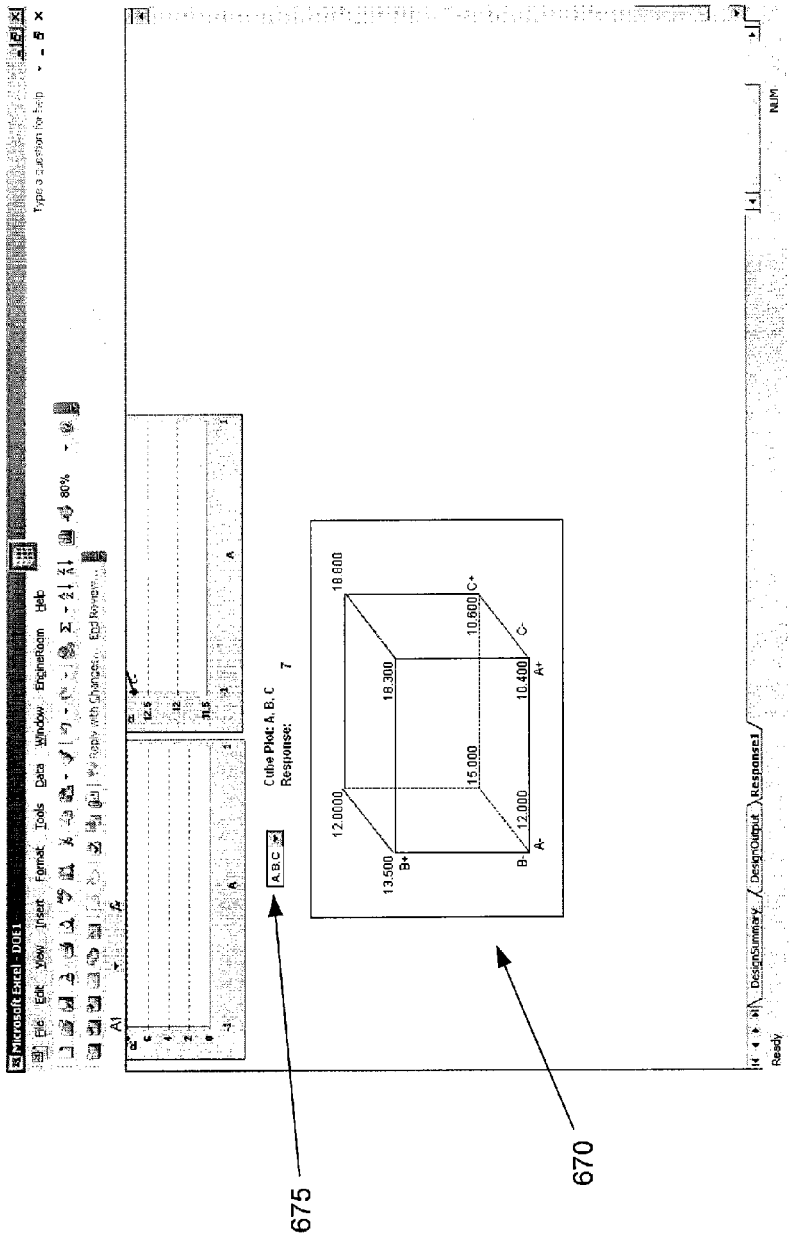
FIG. 34 is a portion of analysis results spreadsheet generated by the software program.

FIGS. 27 and 28 are a sample of a design of experiments. The experiments have three factors, using full factorial experiments with one replication and one response. The experiments were run and response data entered into the table. Once all the experiments have been run, and the results entered into the table, the user selects a run default analysis option from a pull-down menu. The system runs the analysis and provides the results of the analysis in several forms shown in a response worksheet (FIGS. 29-34).

The results are given in an effect table 600, an ANOVA table 605, a recommended model 610, a half normal plot 615, a Pareto chart 620, a normal probability plot 625, a versus fits plot 630, a versus order plot 635, a histogram 640, a plurality of main effect plots 645-655, a plurality of interaction plots 660-665, and a cube plot 670. For the main effect plots 645-655, the interaction plots 660-665, and the cube plot 670, a pull-down menu 675 allows the user to determine which factor or interaction to show in each graph.

The software analyzes the data, and determines which factors and interactions are significant. The software then highlights the significant factors and interactions and produces a recommended model. For example, the half normal plot highlights (e.g., by color and symbol) the factors or interactions that are significant. In the example shown, factors A and B and interaction AB are significant and are shown as golden squares. The other factors and interactions are shown as blue diamonds. Each of the factors and interactions are also labeled in the chart. Thus a user can quickly identify the significant factors by simply viewing the plot.

Similarly, in the Pareto chart, the factors and interactions that are significant are grouped together and shown in gold, while the less significant factors and interactions are shown in blue.

A recommended model (in the example: Response 1=0.7*A+1.825*B+2.2*AB+13.825) is automatically generated by the software, providing a user who is not fluent in the analysis with an optimum model or saving a fluent user the time needed to generate the model.

Various features and advantages of the invention are set forth in the following claims.

What is claimed is:

1. A method of automatically designing a plurality of experiments for analyzing at least one data set from a process to determine a relationship of a plurality of process factors of interest to a process output of interest, the method comprising using a computer to carry out the steps of:

eliciting input from a user to determine at least one characteristic of the data set including a quantity of the plurality of factors and whether one or more of the plurality of factors has greater than two levels;

selecting a design from a plurality of experiment designs based on established conventions for each of the plurality of experiment designs, the design applicable to the elicited at least one characteristic of the data set;

providing a design of experiments including a standard order of the experiments and a run order of the experiments, the design of experiments indicating the combinations of factors and levels for each experiment; and wherein the plurality of experiment designs includes a low resolution fractional factorial design and a high resolution fractional factorial design, and wherein selecting the design includes, in response to an indication of ruggedness, selection of the low resolution fractional factorial design, and, in response to an indication of screening, selection of the high resolution fractional factorial design.

2. The method of claim 1 wherein selecting a design includes eliciting an indication of the number of levels for each factor of interest.

3. The method of claim 1 wherein selecting a design includes seeking a description of each of the factors of interest.

4. The method of claim 1 wherein selecting a design includes, in response to an indication that at least one factor of interest has more than two levels, providing a confirmatory notification that the factors shall be considered categorical.

5. The method of claim 1 wherein selecting a design includes, in response to an indication that at least one factor of interest has greater than two levels, providing confirmatory notification that at least one factor has more than two levels.

6. The method of claim 1 wherein selecting a design includes providing a confirmatory notification of the number of runs in the design for a single replicate.

7. The method of claim 1 wherein, in response to an indication that each of the factors of interest have 2 or fewer levels and that the number of factors of interest is greater than a threshold number of factors, eliciting information as to whether the design should test for ruggedness or screening of the factors of interest.

8. The method of claim 7 wherein the threshold number of factors is four.

9. The method of claim 7 wherein the plurality of experiment designs includes a low resolution fractional factorial design, and wherein selecting the design includes, in response to an indication of ruggedness, selection of the low resolution fractional factorial design.

10. The method of claim 7 wherein the plurality of experiment designs includes a high resolution fractional factorial design, and wherein selecting the design includes, in response to an indication of screening, selection of the high resolution fractional factorial design.

11. The method of claim 1 wherein, further comprising
providing two or more design types when three or more factors are selected and each factor has only two levels,
eliciting a selection of one of the two or more design types, and
providing a confirmatory notification of type of design selected.

12. The method of claim 1 wherein, in response to an indication of each factor having no more than two levels, eliciting an indication as to whether each factor is numeric or categorical.

13. A non-transitory computer readable medium accessible by a computer processor including a software program for automatically designing a plurality of experiments for analyzing at least one data set from a process to determine a relationship of a plurality of process factors of interest to a process output of interest, the software including modules for:
eliciting input from a user to determine at least one characteristic of the data set including a quantity of the plurality of factors and whether one or more of the plurality of factors has greater than two levels;
selecting a design from a plurality of experiment designs based on established conventions for each of the plurality of experiment designs, the design applicable to the elicited at least one characteristic of the data set;
providing a design of experiments including a standard order of the experiments and a run order of the experiments, the design of experiments indicating the combinations of factors and levels for each experiment; and
wherein the plurality of experiment designs includes a low resolution fractional factorial design and a high resolution fractional factorial design, and wherein selecting the design includes, in response to an indication of ruggedness, selection of the low resolution fractional factorial design, and, in response to an indication of screening, selection of the high resolution fractional factorial design.

14. The method of claim 13 wherein selecting a design includes seeking a description of each of the factors of interest.

15. The method of claim 13 wherein selecting a design includes, in response to an indication that at least one factor of interest has more than two levels, providing a confirmatory notification that the factors shall be considered categorical, and in response to an indication that at least one factor of interest has greater than two levels, providing confirmatory notification that at least one factor has more than two levels.

16. The method of claim 13 wherein selecting a design includes providing a confirmatory notification of the number of runs in the design for a single replicate.

17. The method of claim 13 wherein, in response to an indication that each of the factors of interest have 2 or fewer levels and that the number of factors of interest is greater than a threshold number of factors, eliciting information as to whether the design should test for ruggedness or screening of the factors of interest.

18. The method of claim 13 wherein, further comprising
providing two or more design types when three or more factors are selected and each factor has only two levels,
eliciting a selection of one of the two or more design types, and
providing a confirmatory notification of type of design selected.

19. The method of claim 13 wherein, in response to an indication of each factor having no more than two levels, eliciting an indication as to whether each factor is numeric or categorical.

20. The method of claim 13 wherein selecting a design output includes eliciting an indication of the number of levels for each factor of interest.

* * * * *